(12) United States Patent
Nishio et al.

(10) Patent No.: US 12,021,429 B2
(45) Date of Patent: Jun. 25, 2024

(54) MOTOR, COMPRESSOR, AND MOTOR MANUFACTURING METHOD

(71) Applicant: FUJITSU GENERAL LIMITED, Kanagawa (JP)

(72) Inventors: Tomoki Nishio, Kanagawa (JP); Takashi Suzuki, Kanagawa (JP)

(73) Assignee: FUJITSU GENERAL LIMITED, Kanagawa (JP)

( * ) Notice: Subject to any disclaimer, the term of this patent is extended or adjusted under 35 U.S.C. 154(b) by 290 days.

(21) Appl. No.: 17/619,078

(22) PCT Filed: Jun. 10, 2020

(86) PCT No.: PCT/JP2020/022887
§ 371 (c)(1),
(2) Date: Dec. 14, 2021

(87) PCT Pub. No.: WO2020/261998
PCT Pub. Date: Dec. 30, 2020

(65) Prior Publication Data
US 2022/0263374 A1    Aug. 18, 2022

(30) Foreign Application Priority Data
Jun. 27, 2019 (JP) .................... 2019-120372

(51) Int. Cl.
*H02K 3/52* (2006.01)
*F25B 31/02* (2006.01)
(Continued)

(52) U.S. Cl.
CPC ............. *H02K 3/522* (2013.01); *F25B 31/02* (2013.01); *H02K 15/095* (2013.01); *H02K 21/16* (2013.01); *H02K 2203/12* (2013.01)

(58) Field of Classification Search
CPC ........ H02K 15/095; H02K 21/16; H02K 7/14; H02K 1/276; H02K 3/522; H02K 1/20;
(Continued)

(56) References Cited

U.S. PATENT DOCUMENTS 9,685,832 B2 * 6/2017 Taema ................... H02K 3/345
2013/0169085 A1   7/2013 Taema
(Continued)

FOREIGN PATENT DOCUMENTS

CN    103023167 A    4/2013
CN    103248145 A    8/2013
(Continued)

OTHER PUBLICATIONS

Feb. 2, 2024, Chinese Office Action issued for related CN Application No. 202080043777.X.

*Primary Examiner* — Leda T Pham
(74) *Attorney, Agent, or Firm* — Paratus Law Group, PLLC

(57) ABSTRACT

In insulators of a motor, in an external wall portion, the outer diameter sides of winding drum portions represent winding-drum-portion-side external wall portions, and the outer diameter sides of the opening portions represent opening-portion-side external wall portions; and the winding-drum-portion-side external wall portions have such a thickness in a radial direction that, in the axial direction of a stator, the leading end sides far from the stator are smaller than the base end sides close to the stator, and the thickness of the base end sides of the winding-drum-portion-side external wall portions is greater than the thickness of the opening-portion-side external wall portions.

11 Claims, 17 Drawing Sheets

(51) Int. Cl.
*H02K 15/095* (2006.01)
*H02K 21/16* (2006.01)

(58) Field of Classification Search
CPC ... H02K 3/24; H02K 3/38; H02K 3/44; F04C 29/0085; F04C 29/045; F04C 29/026; F04C 23/008; F25B 31/002; F04B 39/02
See application file for complete search history.

(56) References Cited

U.S. PATENT DOCUMENTS

| | | |
|---|---|---|
| 2013/0200742 A1 | 8/2013 | Seki et al. |
| 2014/0346918 A1 | 11/2014 | Uchitani et al. |
| 2015/0035404 A1 | 2/2015 | Taema |
| 2015/0155760 A1 | 6/2015 | Bessho et al. |

FOREIGN PATENT DOCUMENTS

| | | |
|---|---|---|
| CN | 104067484 A | 9/2014 |
| JP | H11-150900 A | 6/1999 |
| JP | 5110212 B1 | 12/2012 |
| JP | 2013-138585 A | 7/2013 |
| JP | 2018-137926 A | 8/2018 |
| KR | 10-2009-0065936 A | 6/2009 |

\* cited by examiner (B-B)

(A1-A1)

(Q-Q)

(A3-A3)

(A4-A4)

MOTOR, COMPRESSOR, AND MOTOR MANUFACTURING METHOD

CROSS REFERENCE TO PRIOR APPLICATION

This application is a National Stage Patent Application of PCT International Patent Application No. PCT/JP2020/022887 (filed on Jun. 10, 2020) under 35 U.S.C. § 371, which claims priority to Japanese Patent Application No. 2019-120372 (filed on Jun. 27, 2019), which are all hereby incorporated by reference in their entirety.

FIELD

The present invention is related to a motor, a compressor, and a motor manufacturing method.

BACKGROUND

For example, a compressor includes a motor for driving a compressing unit that is used to compress a refrigerant. The motor includes a rotor with a permanent magnet installed therein, and includes a stator that rotates the rotor by generating a rotating magnetic field. The motor transmits the rotative power to the compressing unit via a rotary shaft that is fixed to the rotor. At the end faces in the axial direction of the stator, insulators is disposed. Each insulator includes the following: a cylindrical external wall portion; a plurality of winding drum portions extending in a radial direction from the inner periphery of the external wall portion; and an internal wall portion that is formed in the winding drum portions. The winding drum portions of each insulator are stacked on a plurality of teeth included in the stator; and an electrical wire supplied from a nozzle is wound around the teeth via the winding drum portions so that winding wires are formed.

CITATION LIST

Patent Literature

Patent Literature 1: Japanese Patent No. 5110212

SUMMARY

Technical Problem

In the case of winding a winding wire around a winding drum portion of an insulator, it is possible to think of the following: a nozzle, which has the leading end thereof extending from the center side in a radial direction of the insulator toward the external wall portion beyond the internal wall portion of the winding drum portion, is rotationally moved around the rotation center that is positioned at the center side in a radial direction of the insulator; so that the leading end of the nozzle, which supplies a winding wire, is circled from one end toward the other end of the winding drum portion in the circumferential direction of the external wall portion, and the winding wire is wound around the winding drum portion. In that case, due to the positional relationships that enable the circling of the nozzle, in such a way that any contact between the leading end of the nozzle and the inner periphery of the external wall portion is avoided; the position to start winding the winding wire around the concerned winding drum portion in a radial direction of the external wall portion, shifts to the center side of the insulator. That is, it is not possible to start winding the winding wire around the winding drum portion from a position that is along the inner periphery of the external wall portion. For that reason, on the inner periphery side of the external wall portion in the winding drum portion, there remains a gap between the winding wire and the inner periphery, because of which it is not possible to achieve regular winding of the winding wire in the winding drum portion. That leads to a decline in the space factor of the winding wire.

The technology disclosed herein, is developed in view of the issue mentioned above, and it is an objective of the technology to provide a motor, a compressor, and a motor manufacturing method that enable achieving enhancement in the space factor of the winding wire in an insulator.

Solution to Problem

According to an aspect of the motor disclosed in the application, a motor includes: a rotor; a stator that generates a magnetic field for rotating the rotor; an insulator that is fixed to an end portion in axial direction of the stator, and that is cylindrical in shape; and a winding wire that is wound around the stator via the insulator, wherein the insulator includes an external wall portion that is cylindrical in shape, a plurality of winding drum portions that has one end portion thereof coupled to inner periphery of the external wall portion, and that extends in a rod-like manner from the one end portion toward radial direction of the external wall portion, a plurality of internal wall portions that is formed to protrude from other end portion of the winding drum portions in axial direction of the stator, and an opening portion formed in between each pair of the internal wall portions that are neighboring in circumferential direction, in the external wall portion, outer diameter sides of the winding drum portions represent winding-drum-portion-side external wall portions, and outer diameter sides of the opening portions represent opening-portion-side external wall portions, and the winding-drum-portion-side external wall portions have such thickness in radial direction that, in axial direction of the stator, leading end sides far from the stator are smaller than base end sides close to the stator, and thickness of base end sides of the winding-drum-portion-side external wall portions is greater than thickness of the opening-portion-side external wall portions.

Advantageous Effects of Invention

According to an aspect of the motor disclosed in the application concerned, it becomes possible to enhance the space factor of the winding wire in an insulator.

DESCRIPTION OF EMBODIMENTS

Exemplary embodiments of a motor, a compressor, and a motor manufacturing method disclosed in the application concerned are described below in detail with reference to the accompanying drawings. However, the motor, the compressor, and the motor manufacturing method disclosed in the application concerned are not limited by the embodiments described below.

First Embodiment

Figure 1:
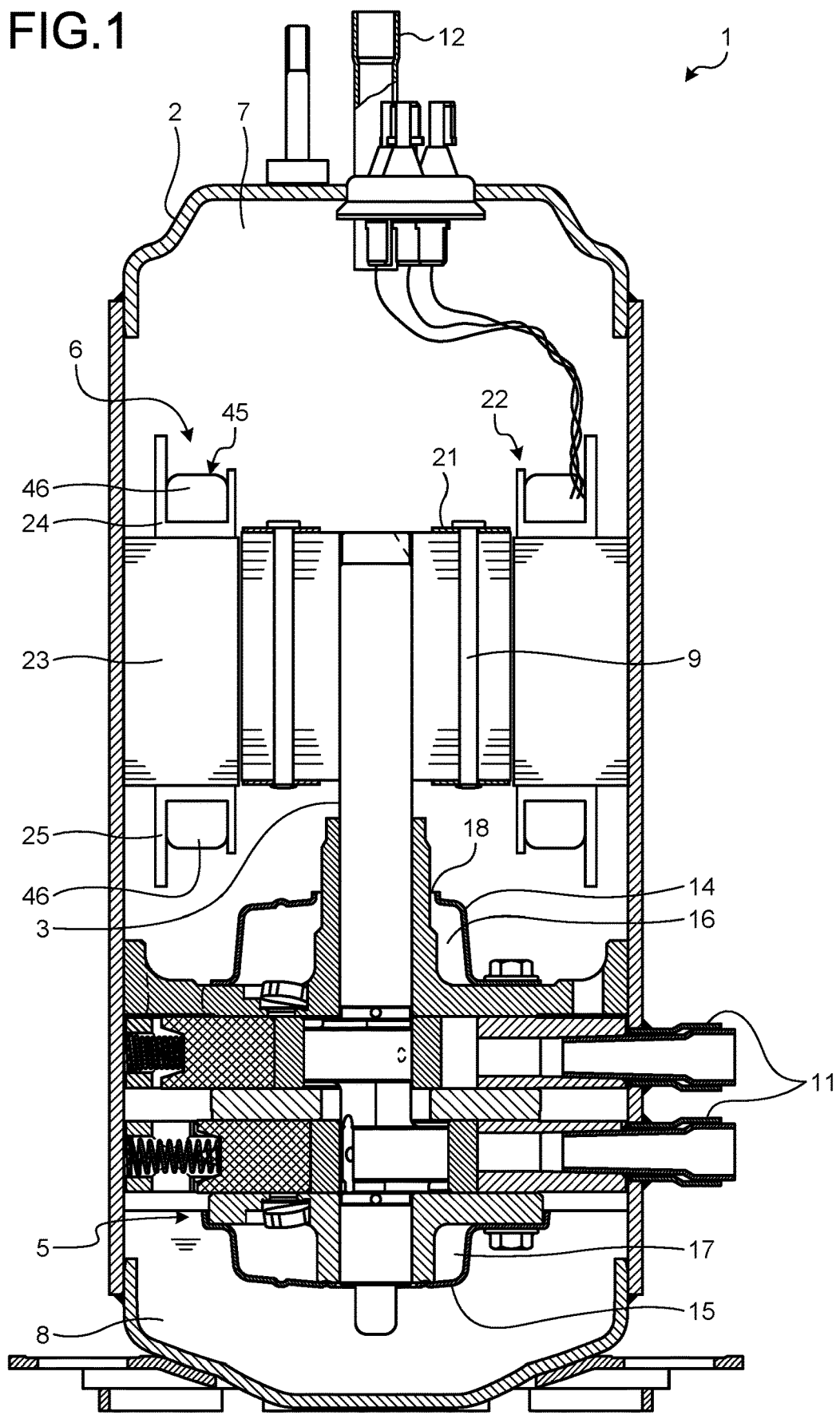
FIG. 1 is a vertical cross-sectional view of a compressor, which includes a three-phase motor, according to a first embodiment.

FIG. 1 is a vertical cross-sectional view of a compressor, which includes a three-phase motor, according to a first embodiment. As illustrated in FIG. 1, a compressor 1 is, what is called, a rotary compressor that includes a container 2, a shaft 3, a compressing unit 5, and a three-phase motor 6. The container 2 is made of a metallic material, and has a closed internal space 7 formed therein. The internal space 7 is formed in a roughly columnar shape. When the container 2 is placed longitudinally in a horizontally plane, the central axis of the column constituting the internal space 7 is parallel to the vertical direction. In the container 2, an oil-sump 8 is formed in the lower portion of the internal space 7. The oil-sump 8 is used to accumulate a refrigeration machine oil that is a lubricant oil meant for providing lubrication to the compressing unit 5. To the container 2, a suction pipe 11 is connected through which the refrigerant is taken in, and a discharge pipe 12 is connected through which the compressed refrigerant is discharged. The shaft 3 is a rotary shaft formed in the shape of a rod, and is disposed in the internal space 7 of the container 2 with one end thereof placed in the oil-sump 8. The shaft 3 is supported by the container 2 in a rotatable manner around the central axis of the column constituting the internal space 7. As a result of the rotation of the shaft 3, the refrigerant oil accumulated in the oil-sump 8 gets supplied to the compressing unit 5.

The compressing unit 5 is placed in the lower part of the internal space 7 and above the oil-sump 8. The compressor 1 further includes an upper muffler cover 14 and a lower muffler cover 15. The upper muffler cover 14 is placed in the upper part of the compressing unit 5 within the internal space 7. In the upper muffler cover 14, an upper muffler chamber 16 is formed. The lower muffler cover 15 is installed in the lower part of the compressing unit 5 within the internal space 7 and above the oil-sump 8. In the lower muffler cover 15, a lower muffler chamber 17 is formed. The lower muffler chamber 17 is communicated with the upper muffler chamber 16 via a passage (not illustrated) formed in the compressing unit 5. In between the upper muffler cover 14 and the shaft 3, a compressed refrigerant discharge hole 18 is formed, and the upper muffler chamber 16 is communicated with the internal space 7 via the compressed refrigerant discharge hole 18.

The compressing unit 5 compresses the refrigerant, which is supplied from the suction pipe 11, as a result of the rotation of the shaft 3, and supplies the compressed refrigerant to the upper muffler chamber 16 and the lower muffler chamber 17. The refrigerant has compatibility with the refrigeration machine oil. The three-phase motor 6 is placed above the compressing unit 5 within the internal space 7.

Figure 2:
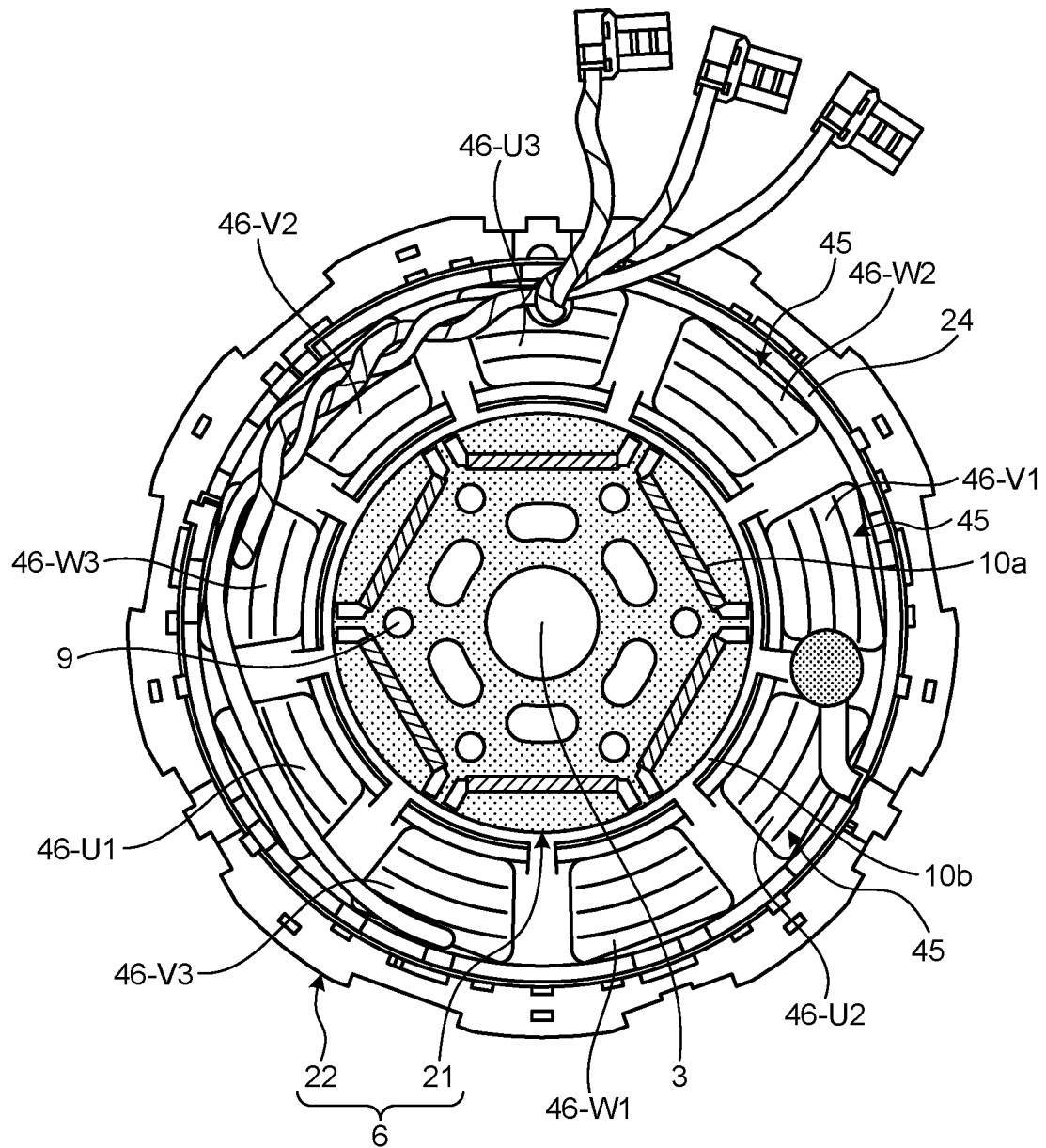
FIG. 2 is a planar view of the three-phase motor from the upper insulator side according to the first embodiment.

FIG. 2 is a planar view of the three-phase motor 6 from the upper insulator side according to the first embodiment. As illustrated in FIGS. 1 and 2, the three-phase motor 6 includes a rotor 21 and a stator 22. The rotor 21 is formed in a columnar shape by laminating a plurality of thin plates (magnetic material) made of silicon steel, and integrating them using a plurality of rivets 9. The shaft 3 is inserted in and fixed to the center of the rotor 21. In the rotor 21, six slit-shaped magnetic embedding holes 10a are formed to constitute the six sides of a hexagon around the shaft 3. The magnetic embedding holes 10a are formed at predetermined intervals in the circumferential direction of the rotor 21. In the magnetic embedding holes 10a, a plate-like permanent magnet 10b is embedded.

The stator 22 is formed in a roughly cylindrical shape, is placed to surround the rotor 21, and is fixed to the container 2. The stator 22 includes a stator core 23, an upper insulator 24, a lower insulator 25, and a plurality of winding wires 46. The upper insulator 24 is fixed to the upper end part of the stator core 23. The lower insulator 25 is fixed to the lower end part of the stator core 23. The upper insulator 24 and the lower insulator 25 represent examples of an insulating unit meant for insulating the stator core 23 from the winding wires 46.

Figure 3:
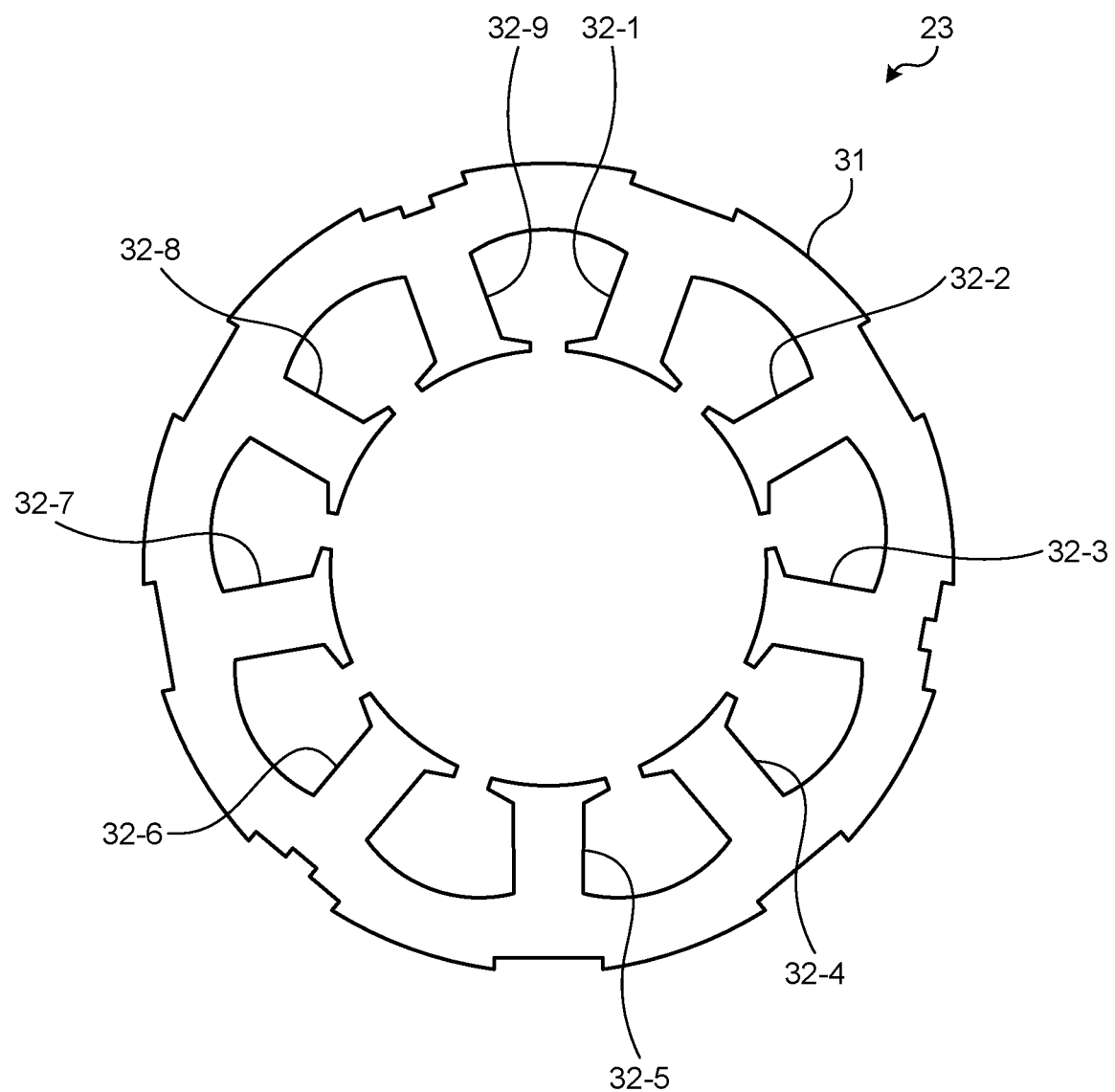
FIG. 3 is a bottom view of a stator core according to the first embodiment.

FIG. 3 is a bottom view of the stator core 23 according to the first embodiment. The stator core 23 is formed by, for example, laminating a plurality of plates made of a soft magnetic material represented by silicon steel plates. As illustrated in FIG. 3, the stator core 23 includes a yoke portion 31 and a plurality of stator core tooth portions 32-1 to 32-9. The yoke portion 31 is formed in a roughly cylindrical shape. Of the stator core tooth portions 32-1 to 32-9, the first stator core tooth portion 32-1 is formed with one end thereof being continuous to the inner periphery of the yoke portion 31, that is, formed to protrude from the inner periphery of the yoke portion 31 toward the central axis of the stator core 23. Moreover, of the stator core tooth portions 32-1 to 32-9, the other stator core tooth portions other than the stator core tooth portion 32-1 are also formed in a roughly cylindrical manner, and protrude from the inner periphery of the yoke portion 31 toward the central axis of the stator core 23 in an identical manner to the first stator core tooth portion 32-1. Moreover, the stator core tooth portions 32-1 to 32-9 are placed at regular intervals of 40[°] on the inner periphery of the yoke portion 31.

Figure 4:
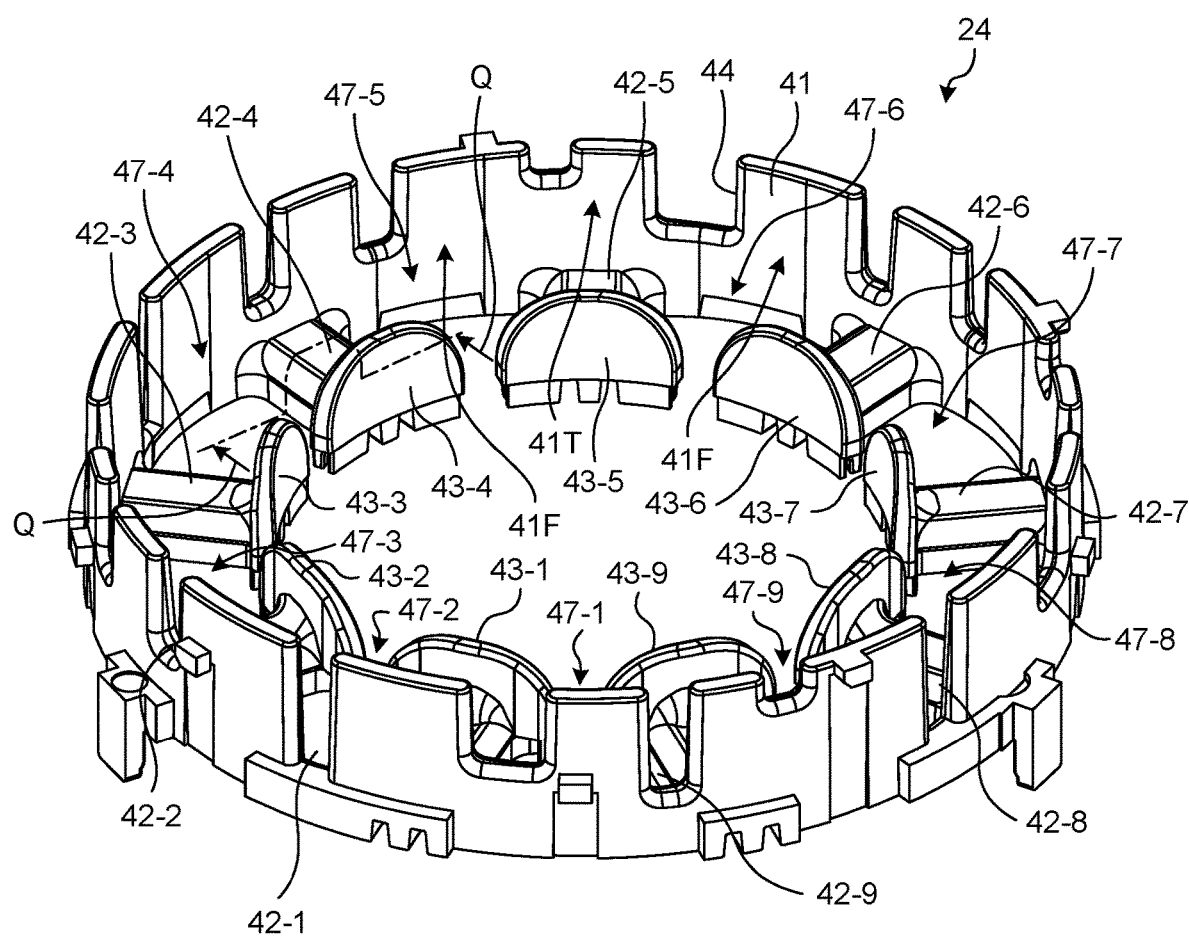
FIG. 4 is a perspective view of an upper insulator according to the first embodiment.

FIG. 4 is a perspective view of the upper insulator 24 according to the first embodiment. The upper insulator 24 is formed in a cylindrical shape using an insulating material represented by polybutylene telephthalate (PBT). As illustrated in FIG. 4, the upper insulator 24 includes a cylindrical external wall portion 41, a plurality of insulator tooth portions 42-1 to 42-9 representing winding drum portions; a plurality of flange portions 43-1 to 43-9 representing internal wall portions; and a plurality of opening portions 47-1 to 47-9 formed in between pairs of flange portions, from among the flange portions 43-1 to 43-9, that are neighboring in the circumferential direction of the upper insulator 24. The external wall portion 41 is formed in a roughly cylindrical shape. Moreover, the external wall portion 41 has a plurality of slits 44 formed thereon. Of the insulator tooth portions 42-1 to 42-9, the first insulator tooth portion 42-1 is formed in a rectangular columnar shape having the cross-sectional surface to be roughly semicircular. Moreover, one end of the first insulator tooth portion 42-1 is formed to be continuous to the inner periphery of the external wall portion 41, that is, formed to extend in a rod-like manner from the inner periphery of the external wall portion 41 toward a radial direction of the external wall portion 41. Moreover, of the insulator tooth portions 42-1 to 42-9, the other insulator tooth portions other than the first insulator tooth portion 42-1 are also formed in a rectangular columnar shape, and extend in a rod-like manner from the inner periphery of the external wall portion 41 toward a radial direction of the external wall portion 41 in an identical manner to the first insulator tooth portion 42-1. Moreover, the insulator tooth portions 42-1 to 42-9 are placed at regular intervals of 40[°] on the inner periphery of the external wall portion 41.

The flange portions 43-1 to 43-9 correspond to the insulator tooth portions 42-1 to 42-9, respectively; and are formed as roughly semicircular plates. Of the flange portions 43-1 to 43-9, the first flange portion 43-1 that corresponds to the first insulator tooth portion 42-1, is formed to be continuous to the other end of the first insulator tooth portion 42-1. Moreover, of the flange portions 43-1 to 43-9, the other flange portions other than the first flange portion 43-1, are also formed to be continuous to the other ends of the corresponding insulator tooth portions, from among the insulator tooth portions 42-1 to 42-9, in an identical manner to the first flange portion 43-1.

The lower insulator 25 is formed in an identical manner to the upper insulator 24. That is, the lower insulator 25 is formed in a cylindrical shape using an insulating material, and includes the external wall portion 41, the insulator tooth portions 42-1 to 42-9, and the flange portions 43-1 to 43-9. In the following explanation, the insulator tooth portions 42-1 to 42-9 present in the upper insulator 24 and the lower insulator 25 are collectively referred to as insulator tooth portions 42. Moreover, the flange portions 43-1 to 43-9 present in the upper insulator 24 and the lower insulator 25 are collectively referred to as flange portions 43.

Figure 5:
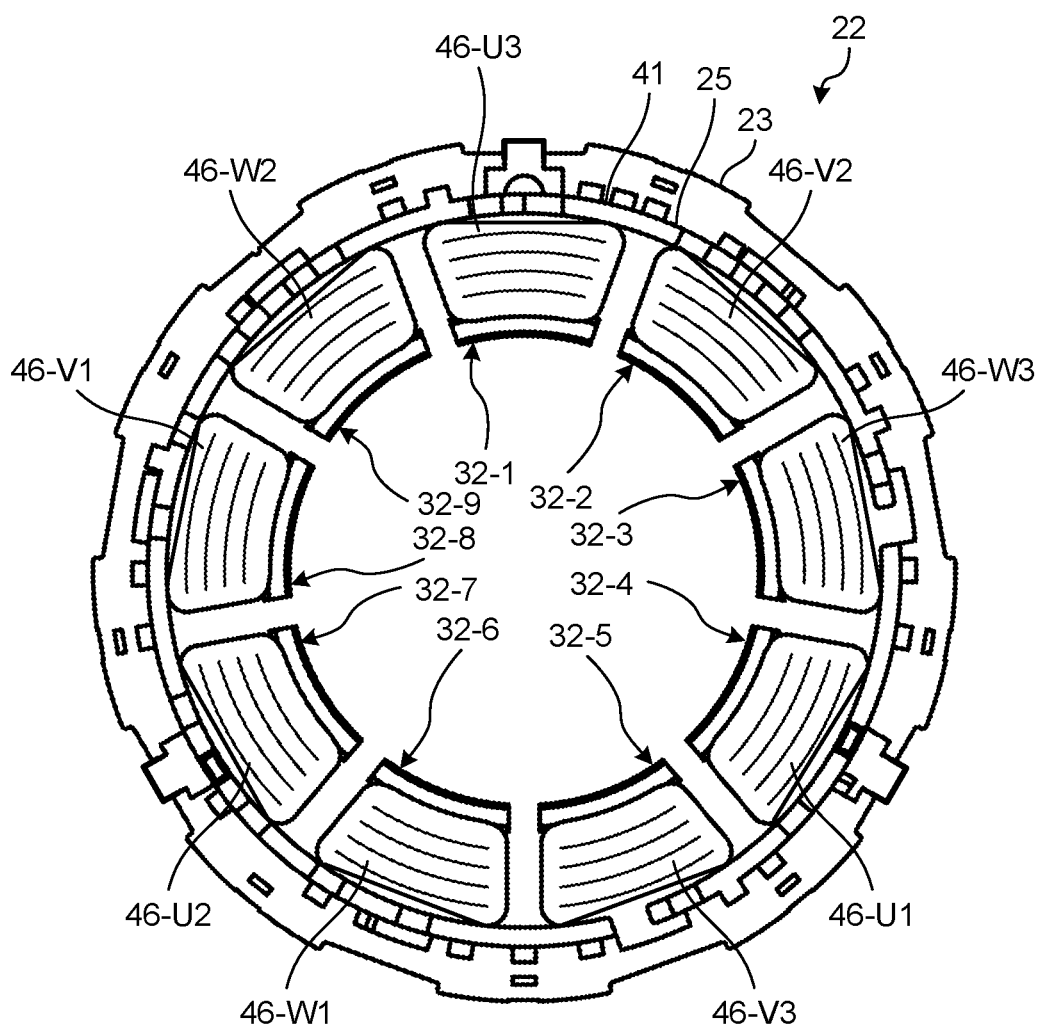
FIG. 5 is a bottom view of a stator according to the first embodiment.

FIG. 5 is a bottom view of the stator 22 according to the first embodiment. As illustrated in FIG. 5, the stator core tooth portions 32-1 to 32-9 of the stator core 23 are wound with the winding wires 46 representing electrical wires. In each of the stator core tooth portions 32-1 to 32-9, a wound portion 45 is formed due to each winding wire 46. The three-phase motor according to the embodiment is a concentrated-winding type motor having six poles and nine slots (see FIG. 2). The winding wires 46 include a plurality of U-phase winding wires 46-U1 to 46-U3, a plurality of V-phase winding wires 46-V1 to 46-V3, and a plurality of W-phase winding wires 46-W1 to 46-W3. Moreover, in the stator 22, the neutral line drawn and bundled from each wound portion 45, is covered by an insulating tube, and is inserted in the gap formed between the corresponding neighboring wound portion 45 in the circumferential direction of the stator 22 (i.e., in the direction of rotation of the rotor 21) (see FIG. 2). In the following explanation, the stator core tooth portions 32-1 to 32-9 present in the stator core 23 are collectively referred to as stator core tooth portions 32.

[Stator Manufacturing Method]

The stator 22 is manufactured by appropriately placing U-phase winding wires, V-phase winding wires, and W-phase winding wires in the stator core 23, to which the upper insulator 24 and the lower insulator 25 are appropriately attached, using a winding machine. Herein, an electrical wire implies, for example, an enameled wire (i.e., an electrical wire in which a copper wire is covered by enamel covering). A winding machine includes, for example, a nozzle for U-phase electrical wires, a nozzle for V-phase electrical wires, and a nozzle for W-phase electrical wires. The nozzle for U-phase electrical wires, the nozzle for V-phase electrical wires, and the nozzle for W-phase electrical wires are fixed to each other. The nozzle for U-phase electrical wires can be appropriately moved with respect to the upper insulator 24 and the lower insulator 25, which are attached to the stator 22, so that the U-phase electrical wire can be placed at predetermined positions with respect to the stator core 23. The nozzle for V-phase electrical wires can be appropriately moved with respect to the upper insulator 24 and the lower insulator 25, which are attached to the stator 22, so that the V-phase electrical wire can be placed at predetermined positions with respect to the stator core 23. The nozzle for W-phase electrical wires can be appropriately moved with respect to the upper insulator 24 and the lower insulator 25, which are attached to the stator 22, so that the W-phase electrical wire can be placed at predetermined positions with respect to the stator core 23. Meanwhile, the winding machine is not limited to have the configuration according to the first embodiment.

Alternatively, it is possible to use a winding machine including only one nozzle. Regarding the wound state in which the electrical wires supplied from the nozzle N (hereinafter, referred to as the winding wires 46) are wound to the insulator tooth portions 42 of the upper insulator 24 and the lower insulator 25, the explanation is given later.

[Operations of Compressor]

The compressor 1 is installed as a constituent element of a refrigeration cycle device (not illustrated), and is used to compress the refrigerant and circulate it in a refrigerant circuit of the refrigeration cycle device. The three-phase motor 6 generates a rotating magnetic field when a three-phase voltage is applied to a plurality of U-phase power wires 48-U1 to 48-U3, a plurality of V-phase power wires 48-V1 to 48-V3, and a plurality of W-phase power wires 48-W1 to 48-W3. The rotor 21 rotates due to the rotating magnetic field generated by the stator 22. Moreover, as a result of the rotation of the rotor 21, the three-phase motor 6 rotates the shaft 3.

When the shaft 3 rotates, the compressing unit 5 takes in a low-pressure refrigerant gas via the suction pipe 11, compresses the low-pressure refrigerant gas to generate a high-pressure refrigerant gas, and supplies the high-pressure refrigerant gas to the upper muffler chamber 16 and the lower muffler chamber 17. The lower muffler cover 15 reduces the pressure pulsation of the high-pressure refrigerant gas, which is supplied to the lower muffler chamber 17, and supplies the high-pressure refrigerant gas having the reduced pressure pulsation to the upper muffler chamber 16. The upper muffler cover 14 reduces the pressure pulsation of the high-pressure refrigerant gas, which is supplied to the upper muffler chamber 16, and supplies the high-pressure refrigerant gas having the reduced pressure pulsation to the space in between the compressing unit 5 and the three-phase motor 6 within the internal space via the compressed refrigerant discharge hole 18.

The high-pressure refrigerant gas, which is supplied in the space between the compressing unit 5 and the three-phase motor 6 within the internal space 7, passes through the gaps that are formed in the three-phase motor 6, and reaches the space above the three-phase motor 6 within the internal space 7. Then, the refrigerant, which is supplied to the space above the three-phase motor 6 within the internal space 7, is discharged into the refrigerant circuit via the discharge pipe 12.

[Characteristic Configuration of Compressor]

Given below is the explanation about the characteristic configuration of the three-phase motor 6 according to the first embodiment. The characteristics according to the first embodiment include the shape of an inner periphery 41a of the external wall portion 41 in the vicinity of the insulator tooth portions 42 of the upper insulator 24 and the lower insulator 25. Although the following explanation is given about the upper insulator 24, the same explanation is applicable for the lower insulator 25.

Figure 6:
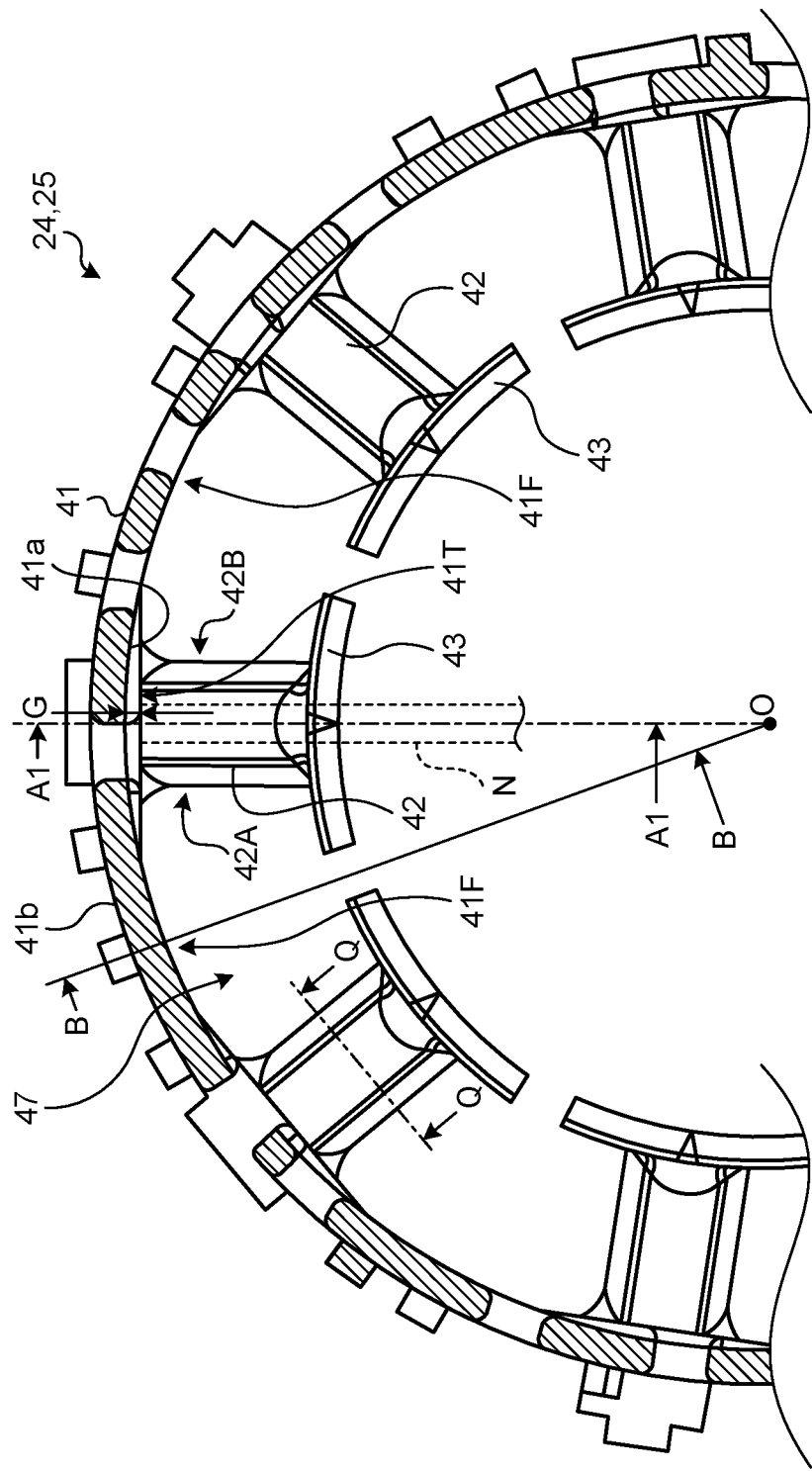
FIG. 6 is a planar view illustrating the main parts of the upper insulator according to the first embodiment.
Figure 7:
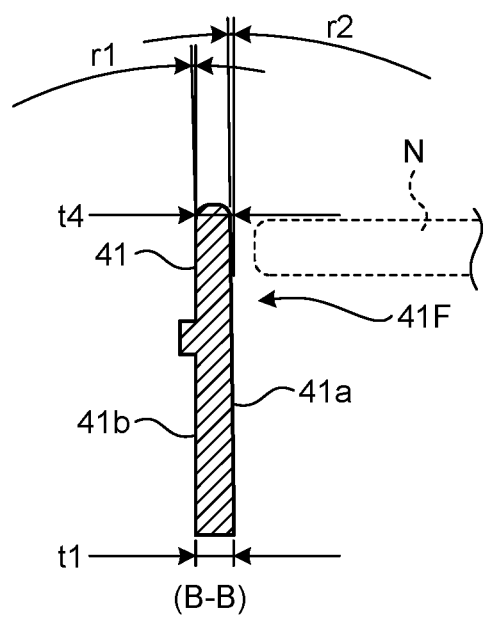
FIG. 7 is a vertical cross-sectional view of the shape of the external wall portion of the upper insulator according to the first embodiment.
Figure 8:
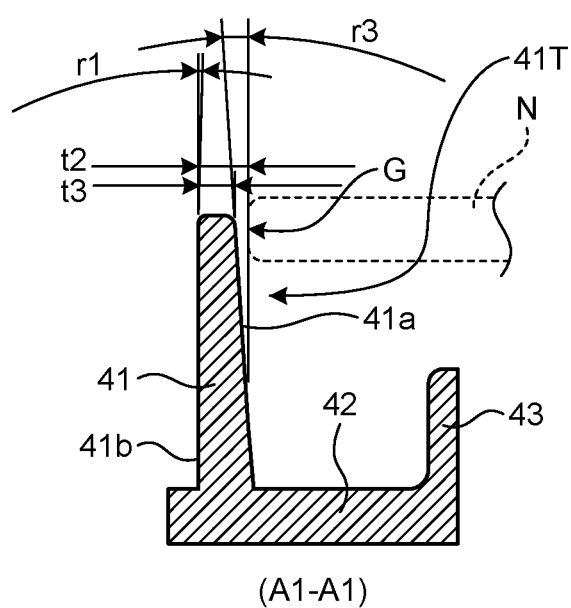
FIG. 8 is a vertical cross-sectional view of the shape of the external wall portion of the upper insulator according to the first embodiment.

FIG. 6 is a planar view illustrating the main parts of the upper insulator according to the first embodiment. FIGS. 7 and 8 are vertical cross-sectional views of the shape of the external wall portion of the upper insulator according to the first embodiment. FIG. 7 is a vertical cross-sectional view along B-B line illustrated in FIG. 6. FIG. 8 is a cross-sectional view along A1-A1 line illustrated in FIG. 6.

As illustrated in FIGS. 4 and 6, the insulator tooth portions 42 of the upper insulator 24 have one end thereof coupled to the inner periphery 41a of the external wall portion 41, and extend from that one end toward the inside in a radial direction of the external wall portion 41; and the flange portions 43 representing the internal wall portions protrude from the other end of the insulator tooth portions 42 in the axial direction of the stator 22 (i.e., the axial direction of the shaft 3). In the external wall portion 41, the outer diameter side of each insulator tooth portion 42, is treated as an insulator-tooth-portion-side external wall portion 41T, and the outer diameter side of each opening portion 47 in between each pair of neighboring flange portions 43, is treated as an opening-portion-side external wall portion 41F. As illustrated in FIGS. 6 and 7, the inner periphery 41a and an outer periphery 41b of each opening-portion-side external wall portion 41F, which corresponds to one of the opening portions 47, are formed to be arc-shaped. However, the inner periphery 41a and the outer periphery 41b of each opening-portion-side external wall portion 41F is not limited to be arc-shaped. The height of each insulator-tooth-portion-side external wall portion 41T, which extends in the axial direction of the stator 22, from the corresponding insulator tooth portion 42, is greater than the height of the flange portion 43, which extends in the axial direction of the stator 22, from the corresponding insulator tooth portion 42.

Since the inner periphery 41a of each opening-portion-side external wall portion 41F is formed to be arc-shaped, at the time of circling the leading end of the nozzle N and winding the winding wire 46 supplied from the nozzle N around the concerned insulator tooth portion 42, the longitudinal direction of the winding wire 46 wound around the insulator tooth portion 42 (i.e., the winding direction of the winding wire 46), becomes parallel to the inner periphery 41a of the opening-portion-side external wall portion 41F. Hence, while avoiding any contact between the leading end of the nozzle N and the external wall portion 41, the winding of the winding wire 46 around the insulator tooth portion 42, can be started from such a position at which the leading end of the nozzle N is brought closer to the inner periphery 41a of the external wall portion 41.

Moreover, as illustrated in FIGS. 4, 6, and 8; in the external wall portion 41 of the upper insulator 24, the insulator-tooth-portion-side external wall portions 41T corresponding to the insulator tooth portions 42, are formed as thick portions having a greater thickness in the external wall portion 41 as compared to the thickness in a radial direction of the opening-portion-side external wall portions 41F present in between the insulator tooth portions 42 (hereinafter, referred to as the thickness of the opening-portion-side external wall portions 41F). Each insulator-tooth-portion-side external wall portion 41T, which has a greater thickness than the opening-portion-side external wall portions 41F, includes a portion in which, in the axial direction of stator 22, the thickness of insulator-tooth-portion-side external wall portion 41T is smaller from the side of the insulator tooth portions 42 toward the upper end side that is the leading end.

As illustrated in FIG. 7, each opening-portion-side external wall portion 41F has a thickness t1 at the lower end on the side of the stator 22, and has a thickness t4 at the upper end on the opposite side of the stator 22. Moreover, the outer periphery 41b of each opening-portion-side external wall portion 41F makes an angle r1 with respect to the axial direction of the stator 22, and the inner periphery 41a of each opening-portion-side external wall portion 41F makes an angle r2 with respect to the axial direction of the stator 22. That is, the thickness t4 at the upper end of each opening-portion-side external wall portion 41F, is smaller than the thickness t1 at the lower end thereof (i.e., t4<t1 holds true). Moreover, as illustrated in FIG. 8, the insulator-tooth-portion-side external wall portion 41T has a thickness t2 at the base end that is coupled with the insulator tooth portion 42, and has a thickness t3 at the upper end on the other side of the stator 22. The base end of the insulator-tooth-portion-side external wall portion 41T indicates the base that is standing from the insulator tooth portion 42. In an identical manner to the outer periphery 41b of the opening-portion-side external wall portion 41F, the outer periphery 41b of the insulator-tooth-portion-side external wall portion 41T makes the angle r1 with respect to the axial direction of the stator 22. Moreover, the inner periphery 41a of the insulator-tooth-portion-side external wall portion 41T makes an angle r3 with respect to the axial direction of the stator 22. That is, the thickness t3 of the upper end of the insulator-tooth-portion-side external wall portion 41T, is smaller than the thickness t2 of the base end thereof (i.e., t3<t2 holds true). Thus, in the opening-portion-side external wall portion 41F and the insulator-tooth-portion-side external wall portion 41T, the angles and the thicknesses satisfy the following relationships.

$$r3>r2 \geq r1 \quad \text{(Equation 1)}$$

$$t1<t2 \quad \text{(Equation 2)}$$

$$t3 \leq t4 \quad \text{(Equation 3)}$$

Moreover, as illustrated in FIGS. 7 and 8, the thickness t3 at the upper end of the insulator-tooth-portion-side external wall portion 41T, is smaller than the thickness t3 at the base end thereof, and is equal to or smaller than the thickness t1 at the lower end of the opening-portion-side external wall portion 41F (i.e., t3≤t1<t2 holds true).

That is, in the circumferential direction of the external wall portion 41, the thickness t2 at the base end of the insulator-tooth-portion-side external wall portions 41T, is greater than the thickness t1 of the opening-portion-side external wall portions 41F that are present in between the insulator tooth portions 42. As a result, the mechanical strength of the insulator-tooth-portion-side external wall portions 41T is enhanced, and the external wall portion 41 is prevented from collapsing toward the inside in a radial direction. Moreover, in the insulator-tooth-portion-side external wall portions 41T, the thickness at the leading end side farther from the stator 22 in the axial direction of the stator 22 (i.e., the thickness at the upper end side of the insulator-tooth-portion-side external wall portions 41T), is smaller than the thickness at the base end side closer to the stator 22 in the axial direction of the stator 22 (i.e., the thickness at the base end side of insulator-tooth-portion-side external wall portions 41T). For example, the thickness of the insulator-tooth-portion-side external wall portions 41T gradually becomes smaller with an increase in the distance from the stator 22 in the axial direction of the stator 22 (i.e., from the base end side of the insulator-tooth-portion-side external wall portions 41T). As a result, at the time of winding the winding wire 46, a gap G is secured in between the leading end N of the nozzle N, which passes through the middle part of each insulator tooth portion 42 in the circumferential direction of the insulator-tooth-portion-side external wall portion 41T, and the inner periphery 41a. Hence, the leading end of the nozzle N, which is used to wind the winding wire 46 around each insulator tooth portion 42, is prevented from making contact with the insulator-tooth-portion-side external wall portion 41T.

Meanwhile, in the circumferential direction of the external wall portion 41, the thickness of the external wall portion 41 of the upper insulator 24 goes on increasing from the opening-portion-side external wall portions 41F toward the middle part of the insulator tooth portions 42. More particularly, in the circumferential direction of the external wall portion 41, the thickness of the insulator-tooth-portion-side external wall portions 41T changes in such a way that the thickness t2 at the base end thereof, becomes greater than the thickness t1 at the lower end of the opening-portion-side external wall portions 41F. With that, the mechanical strength of the insulator-tooth-portion-side external wall portions 41T is further enhanced, because of which the external wall portion 41 is prevented from collapsing toward the inside in a radial direction as a result of deterioration with age.

Moreover, for example, in the circumferential direction of the external wall portion 41, the angle r3 of the inner periphery 41a of each insulator-tooth-portion-side external wall portion 41T, is in the approximate range of 1[°] to 4[°] at both ends of the corresponding insulator tooth portion 42, and is about 10[°] at the middle part of the corresponding insulator tooth portion 42. Thus, in the circumferential direction of the external wall portion 41, the middle part of each insulator tooth portion 42 is greater than both ends of the insulator tooth portion 42. As a result, when the nozzle N, which is used to wind the winding wire 46 around each insulator tooth portion 42, passes through the middle part of the insulator tooth portion 42, the gap G is secured in between the leading end of the nozzle N and the inner periphery 41a as illustrated in FIG. 8, so that any contact between the nozzle N and the inner periphery 41a, is avoided.

[Main Part of Winding Process of Winding Wire]

Figure 9:
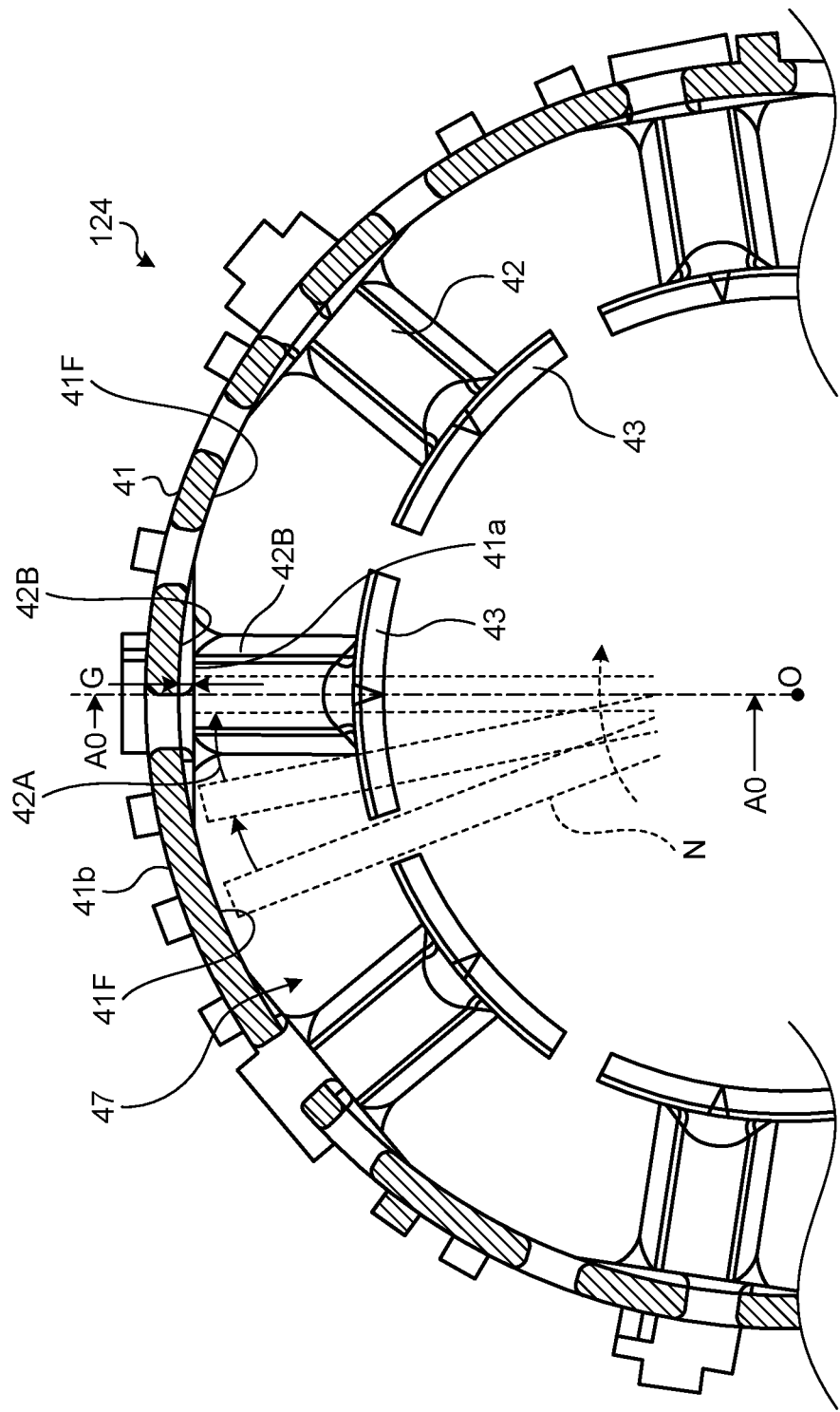
FIG. 9 is a planar view of the state in which a nozzle is used to wind a winding wire around an insulator tooth portion of the upper insulator according to the first embodiment.
Figure 10:
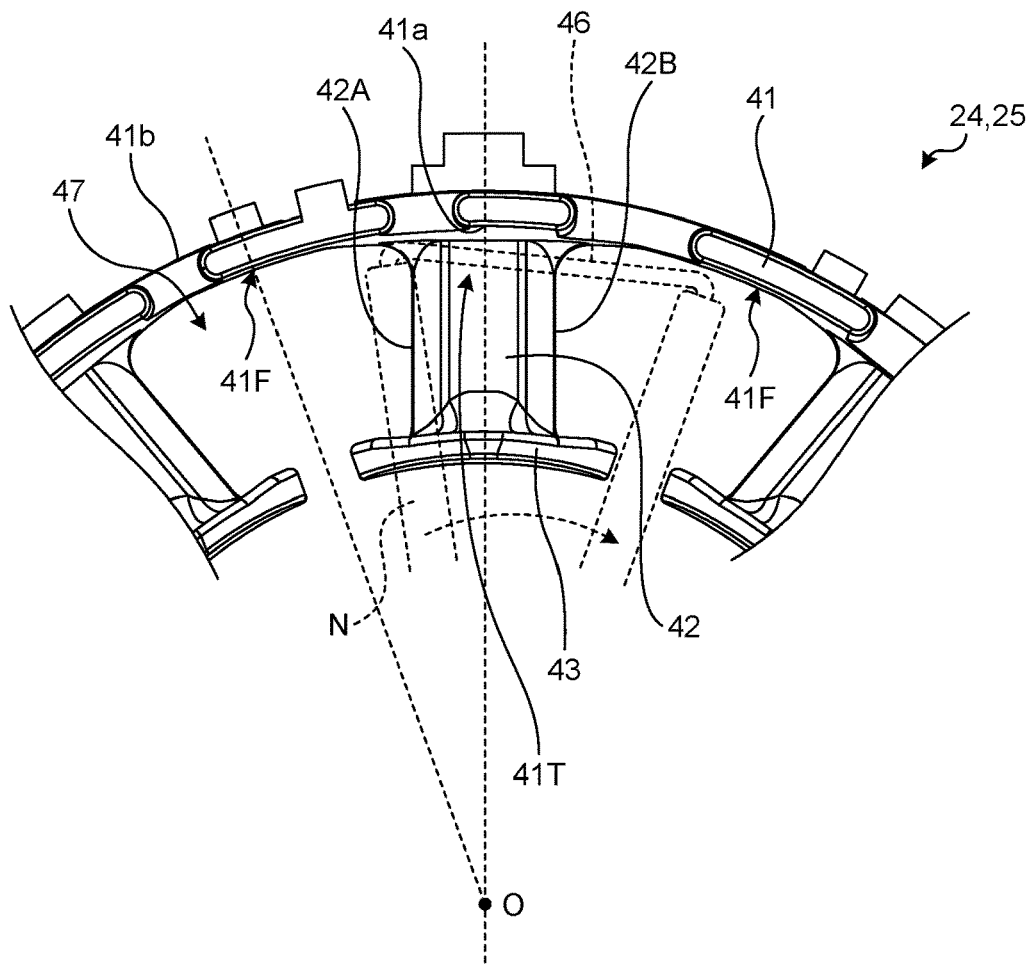
FIG. 10 is an enlarged planar view of the locus of the leading end of the nozzle illustrated in FIG. 9.
Figure 11:
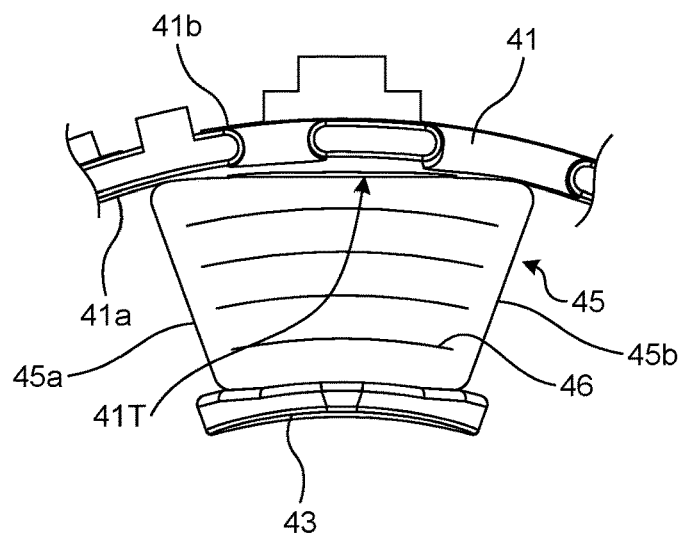
FIG. 11 is a planar view of the state, in which the winding wire is wound around the insulator tooth portion of the upper insulator, according to the first embodiment.

FIG. 9 is a planar view of the state, in which the nozzle N is used to wind the winding wire 46 around each insulator tooth portion 42 of the upper insulator 24, according to the first embodiment. FIG. 10 is an enlarged planar view of the locus of the leading end of the nozzle N illustrated in FIG. 9. FIG. 11 is a planar view of the state, in which the winding wire 46 is wound around the insulator tooth portion 42 of the upper insulator 24, according to the first embodiment. In the winding machine, firstly, the upper insulator 24 and the lower insulator 25 are set along with setting the stator core 23 to which an insulative film (not illustrated) is appropriately attached.

As illustrated in FIGS. 9 and 10, the nozzle N of the winding machine is moved rotationally with respect to the stator core 23 around a rotation center O in a radial direction of the upper insulator 24 and the lower insulator 25; and, with respect to the nozzle N that supplies the winding wire 46, the stator core 23 is moved in the axial direction of the stator 22 by the winding machine. Because of such movement of the nozzle N and the stator core 23, the winding wire 46 are wound around the stator core tooth portions 32 of the stator core 23 via the insulator tooth portions 42 of the upper insulator 24 and the lower insulator 25. As a result, the wound portions 45 are formed.

In the winding machine, the nozzle N extends along a radial direction of the external wall portion 41, and the rotation center O of the nozzle N is positioned on a straight line along a radial direction of the external wall portion 41. Moreover, in the circumferential direction of the external wall portion 41, the center positions of the opening-portion-side external wall portions 41F and the center positions of the insulator-tooth-portion-side external wall portions 41T (i.e., the center positions of the insulator tooth portions 42), are set to make a rotation angle of about 20[°] with respect to the rotation center O of the nozzle N.

The winding machine makes the nozzle N, which is extended from the center side of the external wall portion 41 of the upper insulator 24, move rotationally around the rotation center O, which is at the center side of the external wall portion 41, in such a way that the nozzle N passes above the concerned flange portion 43 in the axial direction of the stator 22. That is, the nozzle N moves rotationally in the circumferential direction of the inner periphery 41a of the external wall portion 41 while avoiding contact with the flange portion 43. At that time, the nozzle N circles along the plane orthogonal to the axial direction of the stator 22 from the opening-portion-side external wall portion 41F toward the insulator-tooth-portion-side external wall portion 41T; and, as a result, in the circumferential direction of the external wall portion 41, winds the winding wire 46 from an entry end 42A, which represents one end in the circumferential direction of the insulator tooth portion 42, toward an exit end 42B, which represents the other end in the circumferential direction of the insulator tooth portion 42.

Then, in the circumferential direction of the external wall portion 41, at the entry end 42A of the insulator tooth portion 42; the nozzle N supplying the winding wire 46 enters the insulator tooth portion 42 so as to make contact with the inner periphery 41a of the external wall portion 41, and the leading end of the nozzle N circles in the middle part of the insulator tooth portion 42 while maintaining the gap G so as not to make contact with the inner periphery 41a of the external wall portion 41. Then, the nozzle N exits from the exit end 42B of the insulator tooth portion 42.

As explained above, in the middle part of the insulator tooth portion 42 in the circumferential direction of the external wall portion 41, the gap G is secured in between the leading end of the nozzle N and the inner periphery 41a. In other words, during the circling of the nozzle N, if it moves to a position that even slightly overlaps with the insulator tooth portion 42 when viewed from the axial direction, the gap G is secured. As a result, the position of the leading end of the nozzle N, which circles from the side of the entry end 42A of the insulator tooth portion 42, can be made to reach the vicinity of the inner periphery 41a of the external wall portion 41, and then the winding can be started. For that reason, the position for starting the winding of the winding wire 46 from the entry end 42A of the insulator tooth portion 42, becomes closer to the inner periphery 41a of the external wall portion 41.

As a result, as illustrated in FIG. 11, regarding the wound portion 45 formed by winding the winding wire 46 around the insulator tooth portion 42, it becomes possible to achieve regular winding in which the winding wire 46 is systematically wound in a regular manner from a position close to the inner periphery 41a of the external wall portion 41. For that reason, lateral faces 45a at both ends of the wound portion 45 (i.e., at the entry end 42A and the exit end 42B) in the circumferential direction of the external wall portion 41, are aligned in straight lines along a radial direction of the external wall portion 41, because of which the wound portion 45 can have the neat shape of a fan. That results in the enhancement of the space factor of the winding wire 46 in the insulator tooth portion 42. Because of the regular winding of the wound portions 45, it becomes possible to secure the space for enabling the nozzle N to pass in between the neighboring wound portions 45. Thus, at the time of winding the winding wires 46, it becomes possible to suppress the contact between the nozzle N and the wound portions 45, thereby enabling prevention of a decline in the insulation properties of the winding wires 46 attributed to the contact. Meanwhile, the regular winding implies that each layer of the winding wire 46 laminated in each wound portion 45 is wound by stacking with a shift in the pitch equal to half of the diameter of the winding wire 46.

Figure 12:
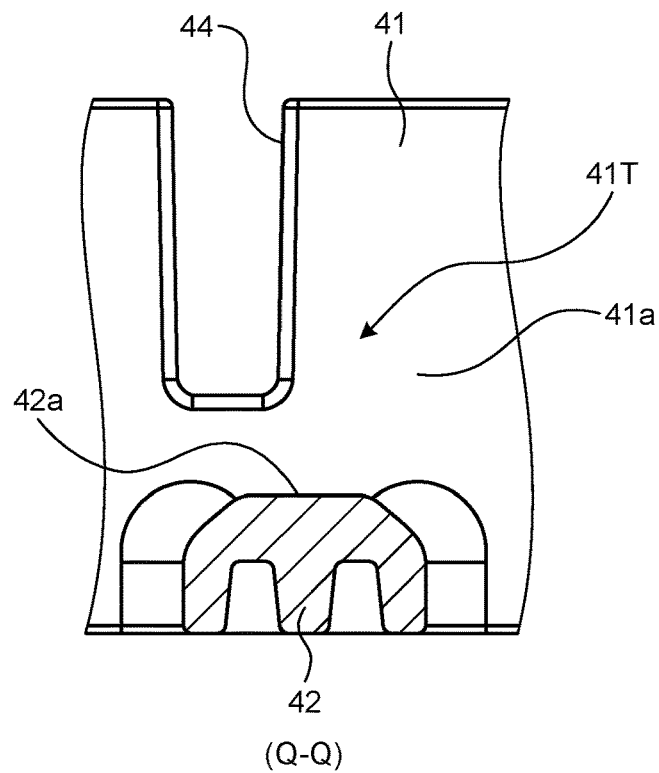
FIG. 12 is a vertical cross-sectional view illustrating a shape of the insulator tooth portion of the upper insulator according to the first embodiment.
Figure 13:
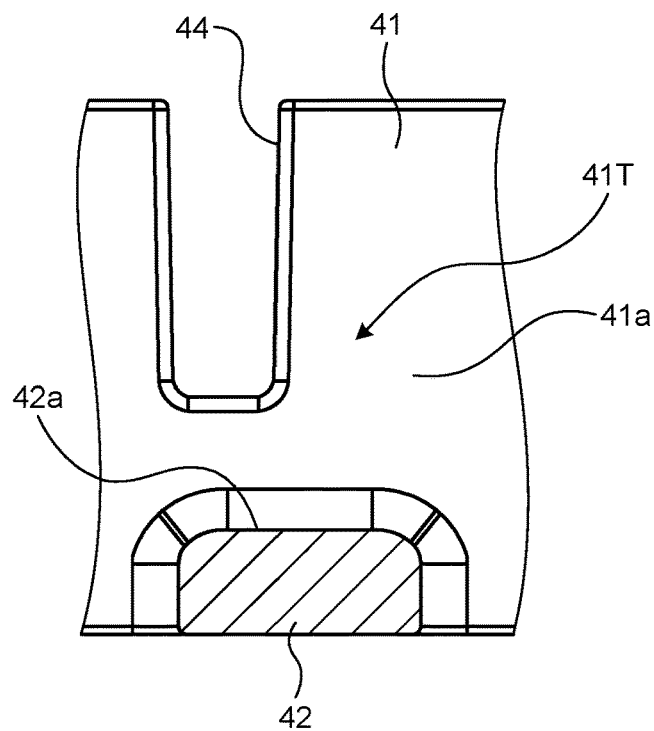
FIG. 13 is a vertical cross-sectional view illustrating another shape of the insulator tooth portion of the upper insulator according to the first embodiment.

Of the insulator tooth portion 42 according to the first embodiment, the peripheral surface around which the winding wire 46 is wound, is formed as a curved surface protruding to the upper end side of the external wall portion 41 (i.e., to the side far from the stator 22) in the axial direction of the stator 22. FIG. 12 is a vertical cross-sectional view illustrating a shape of the insulator tooth portion 42 of the upper insulator 24 according to the first embodiment. FIG. 13 is a vertical cross-sectional view illustrating another shape of the insulator tooth portion 42 of the upper insulator 24 according to the first embodiment. FIG. 12 is a vertical cross-sectional view along Q-Q line illustrated in FIGS. 4 and 6. FIG. 13 is a vertical cross-sectional view in which another shape of the insulator tooth portion 42 is illustrated in an identical manner to FIG. 12.

As illustrated in FIG. 12, a peripheral surface 42a of the insulator tooth portion 42 has a curved surface in such a way that the thickness of the insulator tooth portion 42 in the axial direction of the stator 22 goes on increasing toward the middle part from both ends of the insulator tooth portion 42 (i.e., from the entry end 42A and the exit end 42B) in the circumferential direction of the external wall portion 41. Thus, the peripheral surface 42a is formed in, what is called, a hog-backed shape. In this way, by having the hog-backed shape as the cross-sectional shape of the insulator tooth portion 42, the thickness of the middle part of the insulator tooth portion 42 in the circumferential direction of the external wall portion 41, can be increased, and the mechanical strength can be further enhanced. As a result, even if the external wall portion 41 is about to collapse to the inside, because of the support provided by the insulator tooth portion 42, the external wall portion 41 is further prevented from collapsing to the inside in a radial direction thereof.

Meanwhile, the peripheral surface 42a around which the winding wire 46 is wound in the insulator tooth portion 42, is not limited to be a curved surface protruding to the upper end side of the external wall portion 41. Alternatively, the peripheral surface 42a can be formed as a flat surface as illustrated in FIG. 13.

Figure 14:
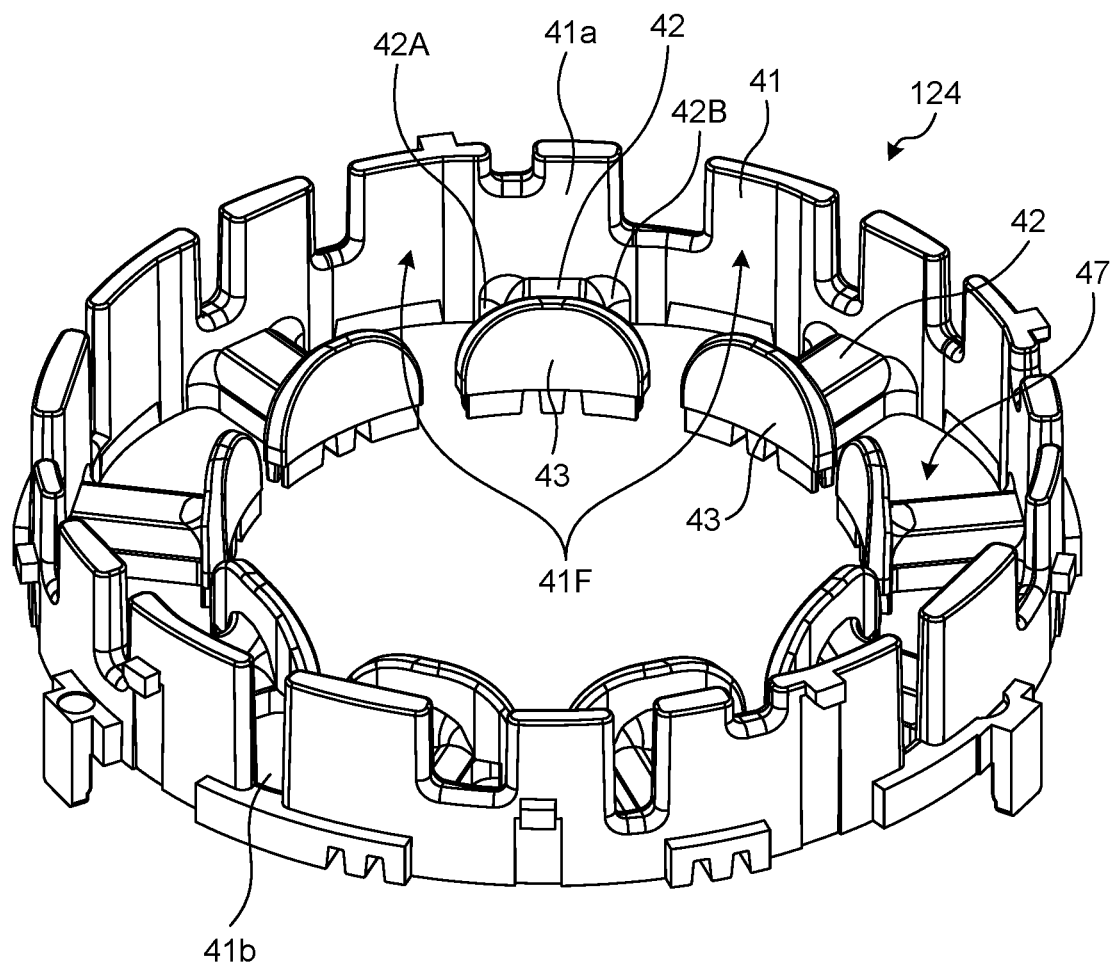
FIG. 14 is a perspective view of an upper insulator according to a comparison example.
Figure 15:
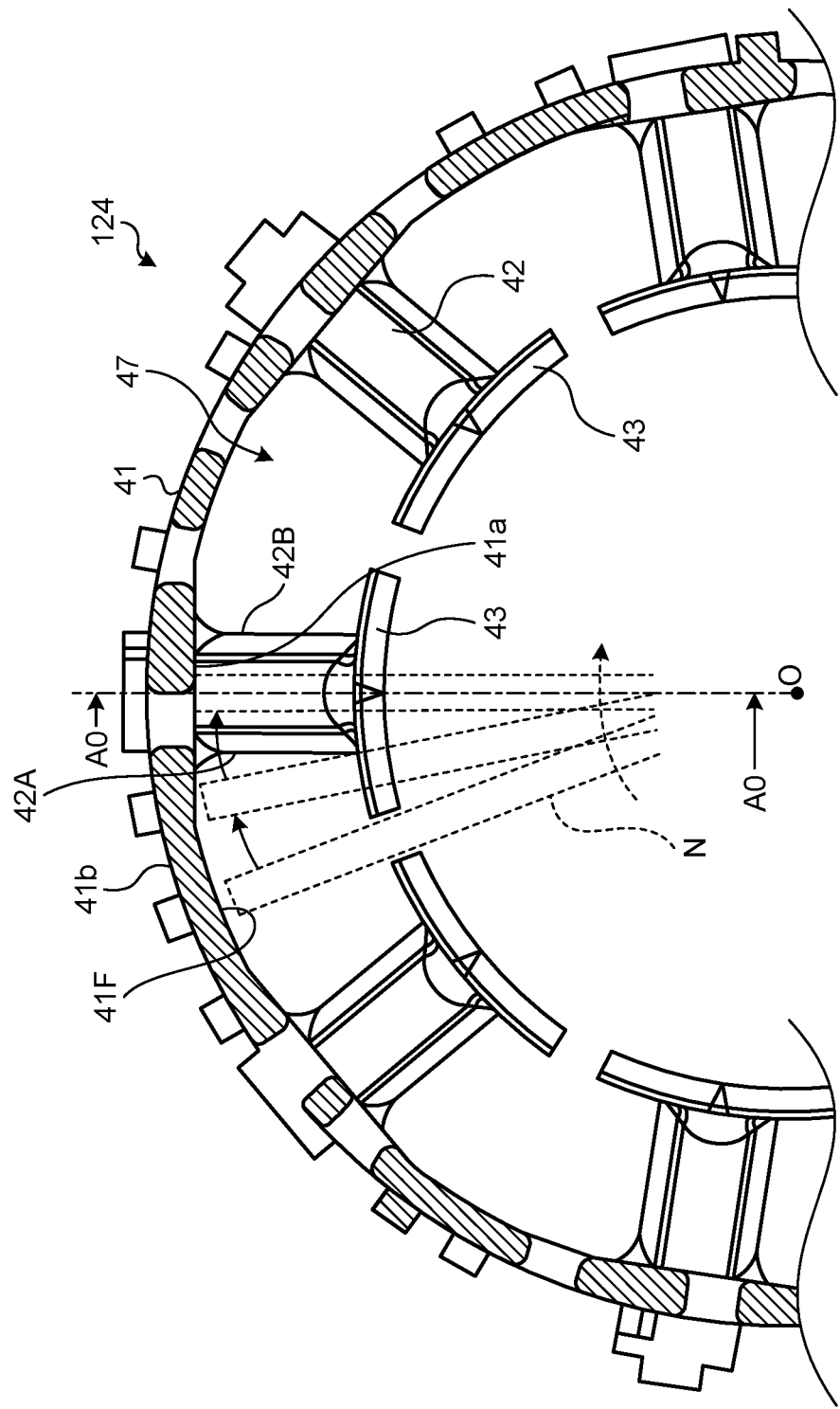
FIG. 15 is a planar view illustrating the state, in which the nozzle is moved rotationally toward one of the insulator tooth portions of the upper insulator, according to the comparison example.

Given below is the explanation of an upper insulator according to a comparison example for the purpose of comparing with the wound state of the winding wires 46 in the upper insulator according to the first embodiment. FIG. 14 is a perspective view of the upper insulator according to the comparison example. FIG. 15 is a planar view illustrating the state, in which the nozzle N is moved rotationally toward one of the insulator tooth portions of the upper insulator, according to the comparison example. In the upper insulator according to the comparison example too, the constituent elements identical to the upper insulator 24 according to the first embodiment, are referred to by the same reference numerals, and their explanation is not given again.

As illustrated in FIGS. 14 and 15, in an upper insulator 124 according to the comparison example, the external wall portion 41 includes the opening-portion-side external wall portions 41F; and, in an identical manner to the first embodiment, the thickness of the external wall portion 41 goes on increasing from the opening-portion-side external wall portions 41F in the circumferential direction of the external wall portion 41 toward the middle part of the insulator tooth portions 42. However, unlike in the first embodiment, in the upper insulator 124 according to the comparison example, the upper end of the external wall portion 41 is not thinner than the base end thereof, and the thickness of the external wall portion 41 is kept constant in the axial direction of the stator 22.

Figure 16:
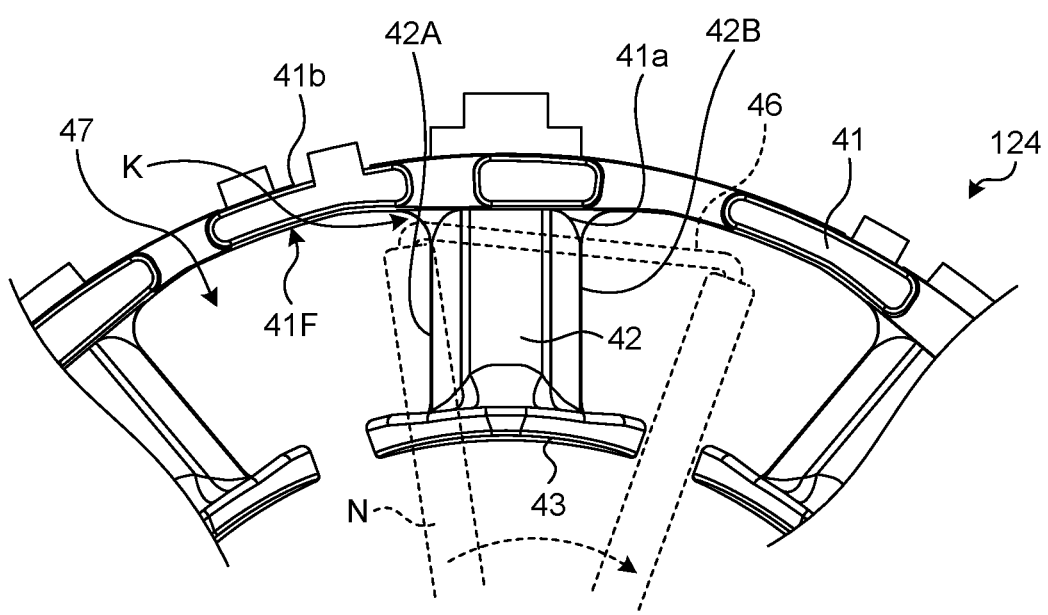
FIG. 16 is a planar view illustrating the state, in which the nozzle is used to wind the winding wire around the insulator tooth portion of the upper insulator, according to the comparison example.
Figure 17:
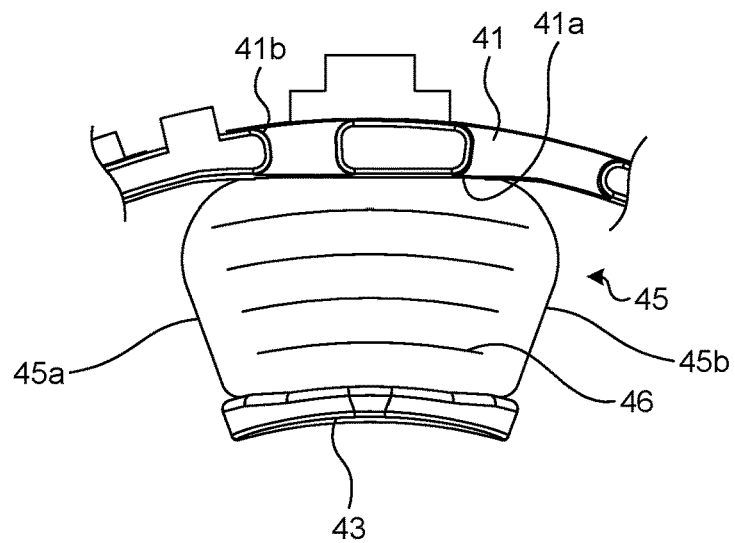
FIG. 17 is a planar view illustrating the state, in which the winding wire is wound around the insulator tooth portion of the upper insulator, according to the comparison example.

FIG. 16 is a planar view illustrating the state, in which the nozzle N is used to wind the winding wire 46 around the insulator tooth portion 42 of the upper insulator 124, according to the comparison example. FIG. 17 is a planar view illustrating the state, in which the winding wire 46 is wound around the insulator tooth portion 42 of the upper insulator 124, according to the comparison example.

As illustrated in FIG. 16, in the case of winding the winding wire 46 around the insulator tooth portion 42 of the upper insulator 124 according to the comparison example, when the nozzle N passes through the middle part of the insulator tooth portion 42 in the circumferential direction of the external wall portion 41, in order to avoid any contact between the leading end of the nozzle N and the inner periphery 41a of the external wall portion 41, the leading end of the nozzle N needs to be circled while keeping it toward the center side in a radial direction of the external wall portion 41. Hence, in the circumferential direction of the external wall portion 41, the position for starting the winding of the winding wire 46, which is supplied from the nozzle N, from the entry end 42A of the insulator tooth portion 42, becomes closer to the flange portion 43.

For that reason, in the comparison example, a gap K occurs in between the winding wire 46 supplied from the leading end of the nozzle N and the inner periphery 41a of the external wall portion 41. In contrast, in the first embodiment explained with reference to FIG. 10, it is possible to suppress the occurrence of the gap K unlike in the comparison example illustrated in FIG. 16. Hence, the position for starting the winding of the winding wire 46, which is supplied from the nozzle N, from the entry end 42A of the insulator tooth portion 42 can be brought closer to the inner periphery 41a of the external wall portion 41. That is, at the entry end 42A of the insulator tooth portion 42, since the gap K occurs in between the position for starting the winding of the winding wire 46 and the inner periphery 41a of the external wall portion 41, unlike in the first embodiment, winding the winding wire 46 along the inner periphery 41a is not possible unlike in the first embodiment.

As a result, as illustrated in FIG. 17, in the wound portion 45 formed by winding the winding wire 46 around the insulator tooth portion 42, no regular winding of the winding wire 46 is not achieved; and, at both ends of the wound portion 45 (i.e., at the entry end 42A and the exit end 42B) in the circumferential direction of the external wall portion 41, the sides of the inner periphery 41a of the lateral faces 45a and 45b have the shape curved in an arc-like manner. That is, in the comparison example, since it is not possible to form the wound portion 45 to have the neat shape of a fan unlike in the first embodiment as illustrated in FIG. 11, it leads to a decline in the space factor of the winding wire 46. Moreover, in the wound portion 45 according to the comparison example, the winding wire 46 tends to be wound in such a way that it bulges from the middle part of the insulator tooth portion 42 toward the inner periphery 41a of the external wall portion 41. For that reason, in the comparison example, at the time of winding the winding wire 46, there is a risk of a contact occurring between the nozzle N and the wound portion 45, and the contact results in a decline in the insulation properties of the winding wire 46.

Effect of First Embodiment

As explained above, in the upper insulator 24 (or the lower insulator 25) of the three-phase motor 6 according to the first embodiment, the thickness in a radial direction of the insulator-tooth-portion-side external wall portions 41T becomes smaller at the upper end side, which is far from the stator 22, than at the base end side, which is closer to the stator 22, in the axial direction of the stator 22; and the thickness t2 at the base end side of the insulator-tooth-portion-side external wall portions 41T, is greater than the thickness t1 of the opening-portion-side external wall portions 41F. As a result, while securing the mechanical strength of the external wall portion 41 and preventing the external wall portion 41 from collapsing to the inside in a radial direction thereof, the space factor of the winding wires 46 in the insulator tooth portions 42 can be enhanced as a result of starting the winding of the winding wires 46 along the inner periphery 41a of the external wall portion 41. Moreover, as a result of starting the winding of the winding wires 46 along the inner periphery 41a of the external wall portion 41, it becomes possible to achieve regular winding of the winding wires 46, and the quality of the wound state of the winding wires 46 in the insulator tooth portions 42 can be enhanced. Furthermore, as a result of the regular winding in the wound portions 45, it becomes possible to prevent any contact between the nozzle N and the wound portions 45 at the time of winding the winding wires 46, thereby enabling prevention of a contact-attributed decline in the insulation properties of the winding wires 46.

Moreover, in the upper insulator 24 (or the lower insulator 25) of the three-phase motor 6 according to the first embodiment, the thickness in a radial direction of the external wall portion 41 goes on increasing from the side of the opening-portion-side external wall portions 41F in the circumferential direction of the external wall portion 41 (the thickness t1 at the lower end of the opening-portion-side external wall portions 41F) toward the middle part of the insulator tooth portions 42 (the thickness t2 at the base end of the insulator-tooth-portion-side external wall portions 41T). As a result, the thickness of the insulator-tooth-portion-side external wall portions 41T becomes greater than the thickness of the opening-portion-side external wall portions 41F, because of which the mechanical strength can be enhanced and the external wall portion 41 can be further prevented from falling to the inside in a radial direction thereof.

Furthermore, in the upper insulator 24 (or the lower insulator 25) of the three-phase motor 6 according to the first embodiment, the external wall portion 41 has a greater height than the flange portions 43 in the axial direction of the stator 22. In such a structure including the external wall portion 41, at the time of winding the winding wires 46, there is a risk that the leading end of the nozzle N makes contact with the inner periphery 41a of the external wall portion 41. Hence, the gap G is secured in between the inner periphery 41a of the insulator-tooth-portion-side external wall portions 41T and the leading end of the nozzle N. As a result, it becomes possible to avoid any contact between the inner periphery 41a of the external wall portion 41 and the leading end of the nozzle N.

Given below is the description of second and third embodiments with reference to the accompanying drawings. In the second and third embodiments, the constituent elements identical to the first embodiment are referred to by the same reference numerals and their explanation is not given again. In the second embodiment, regarding the inner periphery 41a of the insulator-tooth-portion-side external wall portions 41T in the upper insulator 24 and the lower insulator 25, the shape is different than the shape according to the first embodiment.

Second Embodiment

Figure 18:
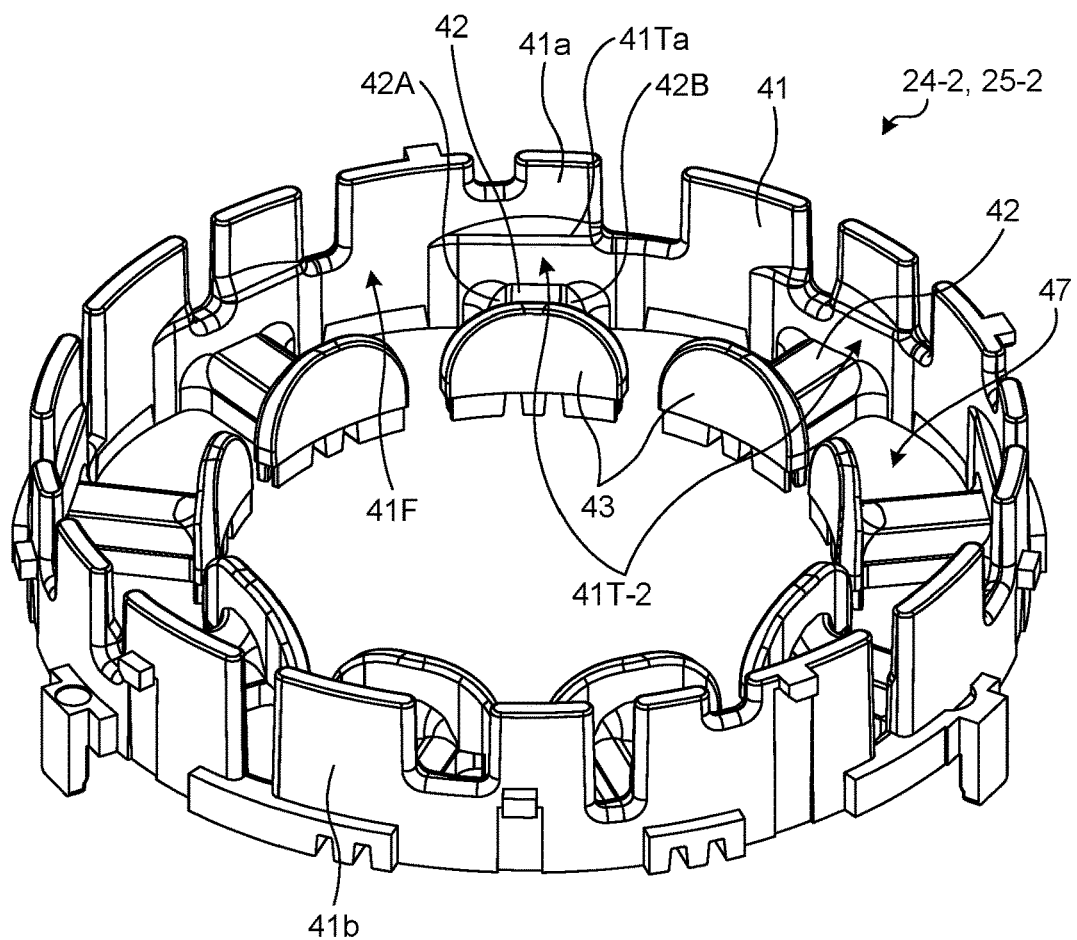
FIG. 18 is a perspective view of an upper insulator according to a second embodiment.
Figure 19:
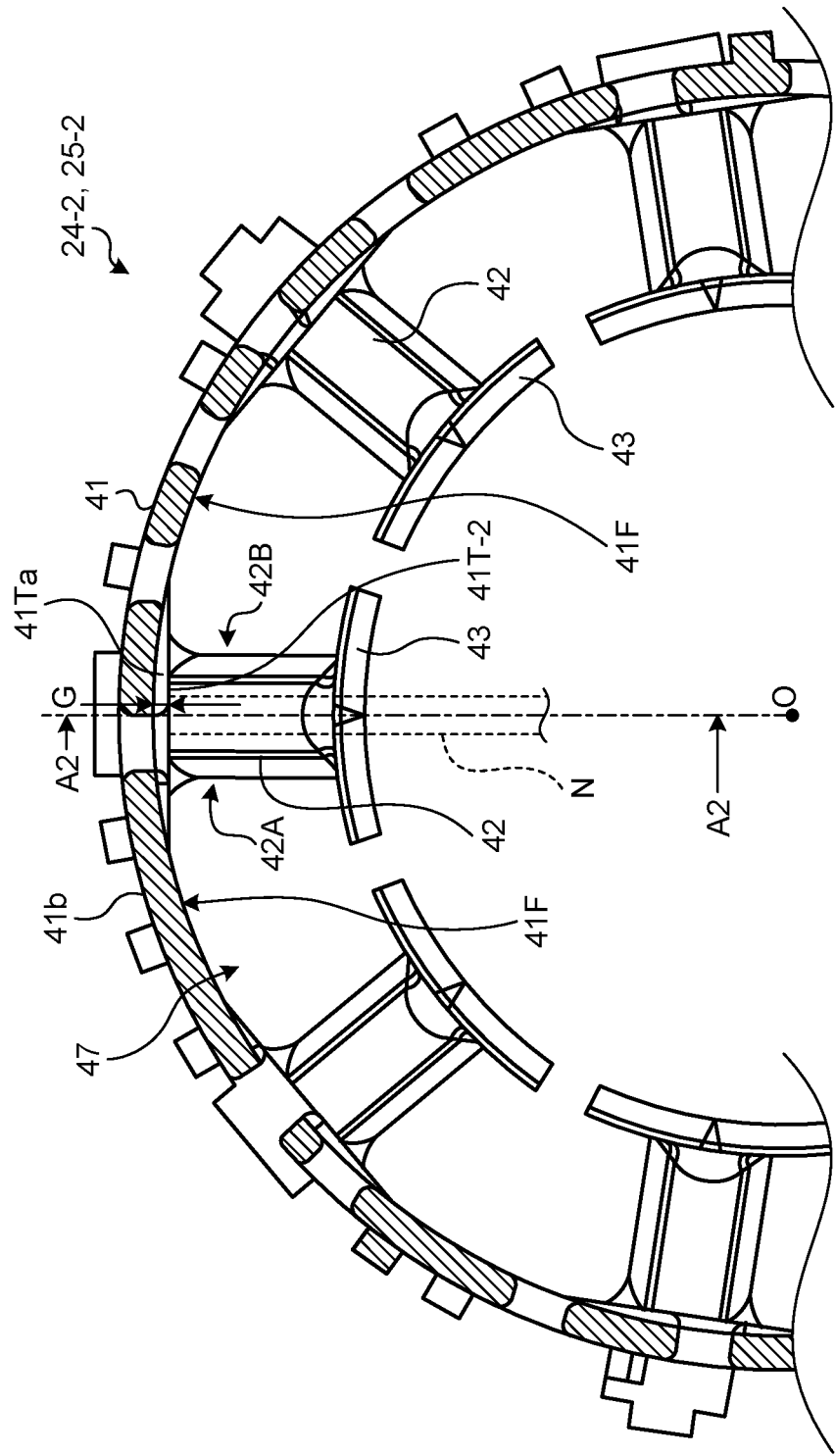
FIG. 19 is a planar view of the main parts of the upper insulator according to the second embodiment.
Figure 20:
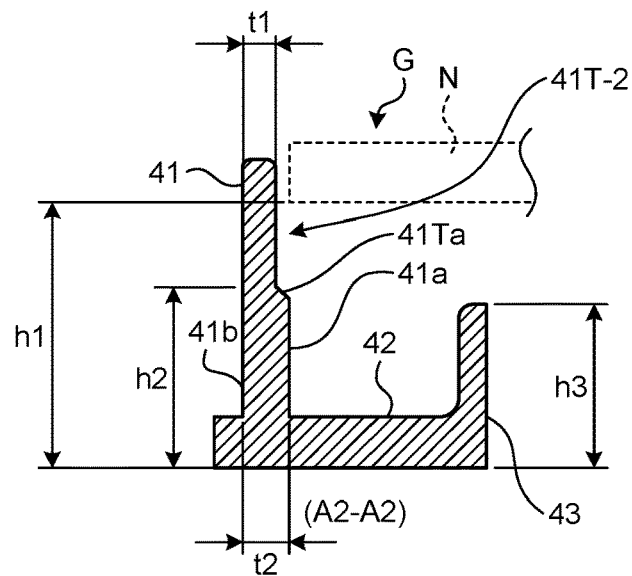
FIG. 20 is a vertical cross-sectional view of the shape of the external wall portion of the upper insulator according to the second embodiment.

FIG. 18 is a perspective view of the upper insulator according to the second embodiment. FIG. 19 is a planar view of the main parts of the upper insulator according to the second embodiment. FIG. 20 is a vertical cross-sectional view of the shape of the external wall portion 41 of the upper insulator according to the second embodiment. Herein, FIG. 20 is a vertical cross-sectional view along A2-A2 line illustrated in FIG. 19.

As illustrated in FIGS. 18 and 19, in an upper insulator 24-2 according to the second embodiment, the external wall portion 41 includes insulator-tooth-portion-side external wall portions 41T-2 having a greater thickness than the opening-portion-side external wall portions 41F. On the inner periphery of each insulator-tooth-portion-side external wall portion 41T-2, a step portion 41Ta is formed at the upper end side that is on the far side from the stator 22 in the axial direction of the stator 22.

As illustrated in FIG. 20, in the insulator-tooth-portion-side external wall portion 41T-2, the base end coupled with the insulator tooth portion 42 has the thickness t2, and the upper end side of the external wall portion 41 has a smaller thickness because of the step portion 41Ta formed midway of the height of the external wall portion 41 in the axial direction of the stator 22. In the second embodiment too, when the opening-portion-side external wall portion 41F has the thickness t1 (see FIG. 7), the following relationship is satisfied.

$$t1 < t2 \quad \text{(Equation 2)}$$

For example, as illustrated in FIG. 20, the upper end of the insulator-tooth-portion-side external wall portion 41T-2 has the thickness t1 that is same as the thickness t1 of the opening-portion-side external wall portion 41F.

Moreover, in the axial direction of the stator 22, when the nozzle N passes through the middle part of the insulator tooth portion 42 at the time of winding the winding wire 46; the lower end of the nozzle N has a height h1, the step portion 41Ta of the insulator-tooth-portion-side external wall portion 41T-2 has a height h2, and the flange portion 43 has a height h3. The height of the step portion 41Ta indicates the height of the boundary between the upper end side of the insulator-tooth-portion-side external wall portion 41T-2, which has a smaller thickness, and the step portion 41Ta. At that time, the step portion 41Ta of the insulator-tooth-portion-side external wall portion 41T-2 satisfies the following relationship.

$$h1 > h2 \geq h3 \quad \text{(Equation 4)}$$

Since Equations 2 and 4 are satisfied by the insulator-tooth-portion-side external wall portion 41T-2 having the step portion 41Ta formed therein; as illustrated in FIGS. 19 and 20, at the time of winding the winding wire 46, the gap G is secured in between the leading end of the nozzle N, which passes through the middle part of the insulator tooth portion 42 in the circumferential direction of the insulator-tooth-portion-side external wall portion 41T-2, and the inner periphery 41a. As a result, any contact between the nozzle N and the inner periphery 41a, is avoided.

Moreover, in the second embodiment too, in an identical manner to the first embodiment, the position for starting the winding of the winding wire from the entry end 42A of the insulator tooth portion 42, is closer to the inner periphery 41a of the external wall portion 41. Hence, regarding the wound portion 45 formed in the insulator tooth portion 42, regular winding is achieved in which the winding wire 46 is systematically wound as illustrated in FIG. 11.

Effect of Second Embodiment

On the external wall portion 41 of the upper insulator 24-2 according to the second embodiment, the insulator-tooth-portion-side external wall portions 41T-2 are formed to have the step portion 41Ta. As a result, in the insulator-tooth-portion-side external wall portions 41T-2, it becomes possible to provide a larger portion with a greater thickness on the side of the insulator tooth portions 42 (on the side of the stator 22). For that reason, as compared to the insulator-tooth-portion-side external wall portions 41T according to the first embodiment, the mechanical strength of the insulator-tooth-portion-side external wall portions 41T-2 can be further enhanced. Thus, in the second embodiment too, in an identical manner to the first embodiment, the external wall portion 41 can be prevented from collapsing to the inside in a radial direction thereof.

Furthermore, in the second embodiment too, in an identical manner to the first embodiment, since the winding of the winding wires 46 is started along the inner periphery 41a of the external wall portion 41, it becomes possible to achieve regular winding of the winding wires 46, thereby enabling achieving enhancement in the quality of the wound state of the winding wires 46 in the insulator tooth portions 42 as well as achieving enhancement in the space factor of the winding wires 46 in the insulator tooth portion 42. Moreover, because of the regular winding achieved in the wound portions 45, the nozzle N is prevented from making contact with the wound portions 45 during the winding of the winding wires 46. Hence, it becomes possible to prevent a contact-attributed decline in the insulation properties of the winding wires 46.

Third Embodiment

In the third embodiment, in the upper insulator 24 and the lower insulator 25, regarding the inner periphery 41a of the insulator-tooth-portion-side external wall portions, the shape is different than the shape of the inner periphery 41a of the insulator-tooth-portion-side external wall portions 41T according to the first embodiment and the inner periphery 41a of the insulator-tooth-portion-side external wall portions 41T-2 according to the second embodiment.

Figure 21:
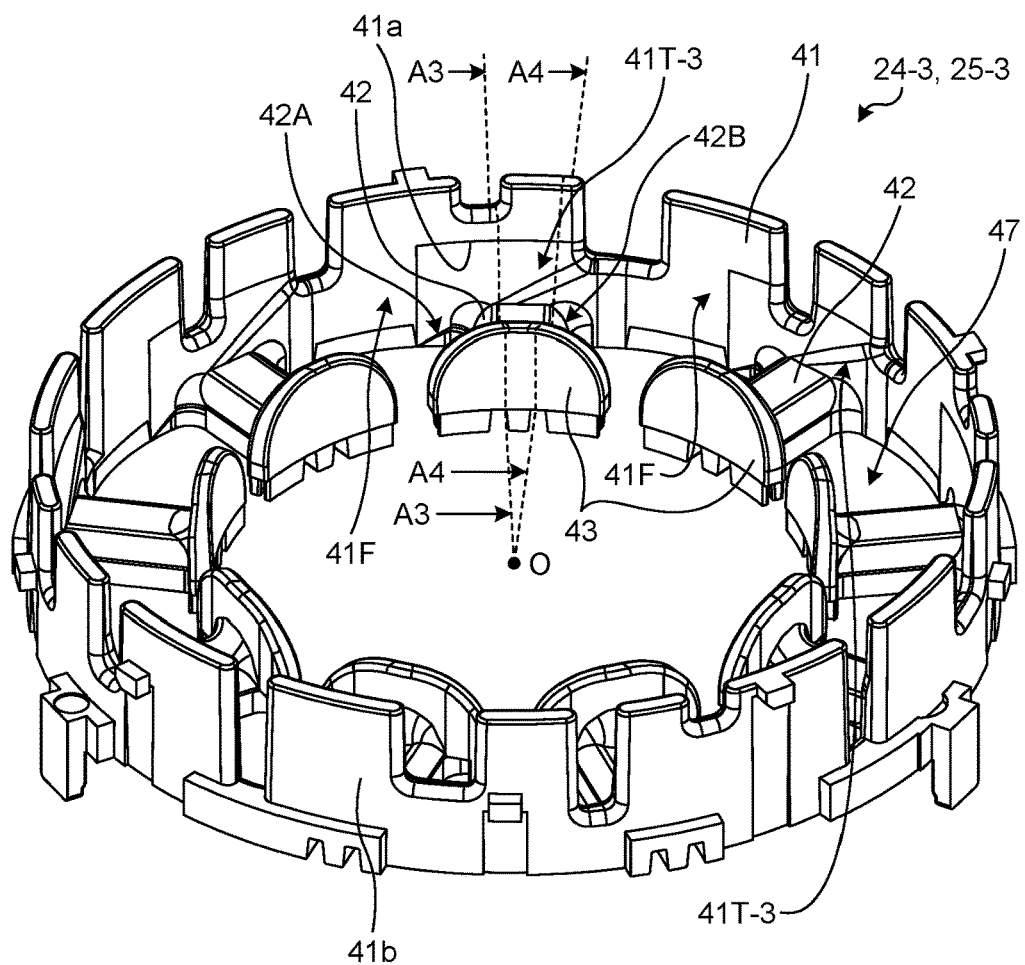
FIG. 21 is a perspective view of an upper insulator according to a third embodiment.
Figure 22:
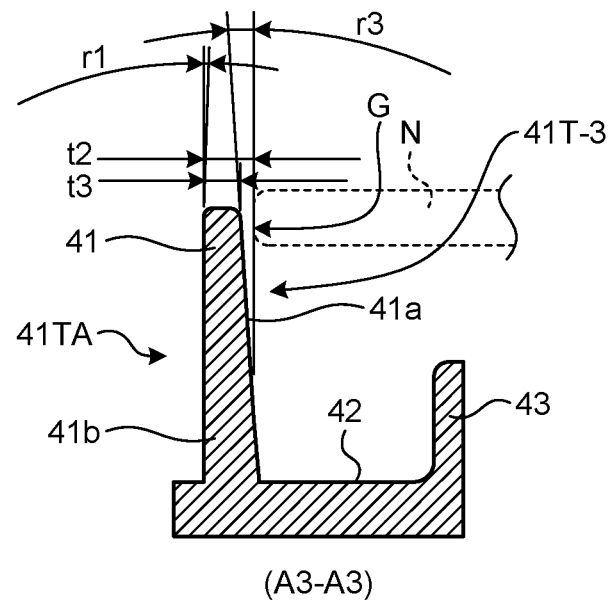
FIG. 22 is a vertical cross-sectional view illustrating a shape of the external wall portion of the upper insulator according to the third embodiment.
Figure 23:
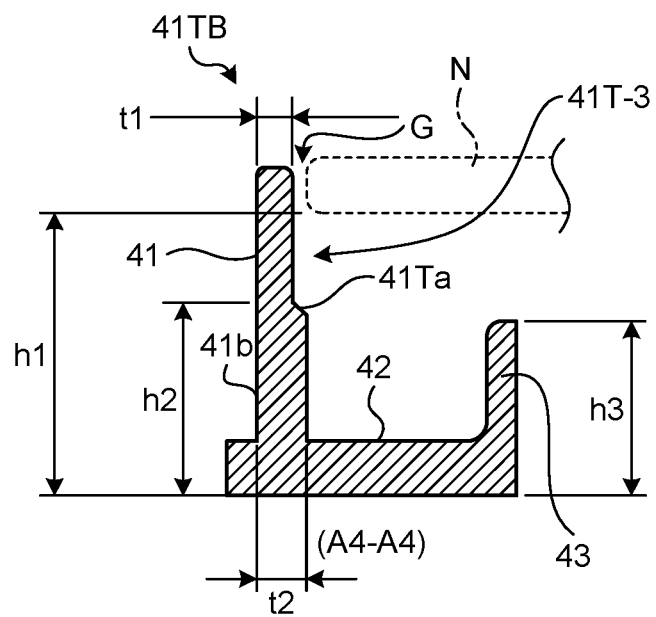
FIG. 23 is a vertical cross-sectional view illustrating a shape of the external wall portion of the upper insulator according to the third embodiment.

FIG. 21 is a perspective view of the upper insulator according to the third embodiment. FIGS. 22 and 23 are vertical cross-sectional views illustrating the shapes of the external wall portion 41 of the upper insulator according to the third embodiment. FIG. 22 is a vertical cross-sectional view along A3-A3 line illustrated in FIG. 21, and is a vertical cross-sectional view of the side of the entry end 42A of the insulator tooth portion 42. FIG. 23 is a vertical cross-sectional view along A4-A4 line illustrated in FIG. 21, and is a vertical cross-sectional view of the side of the exit end 42B of the insulator tooth portion 42. The A3-A3 line and the A4-A4 line are section lines passing through the rotation center O of the nozzle N, and running along a radial direction of the upper insulator.

As illustrated in FIG. 21, in an upper insulator 24-3 according to the third embodiment, the external wall portion 41 includes insulator-tooth-portion-side external wall portions 41T-3. Each insulator-tooth-portion-side external wall portion 41T-3 has different thicknesses on the side of the entry end 42A and on the side of the exit end 42B of the insulator tooth portion 42 in the circumferential direction. In the insulator-tooth-portion-side external wall portion 41T-3, the thickness on the side of the exit end 42B is greater than the thickness on the side of the entry end 42A. As illustrated in FIGS. 22 and 23, on the inner periphery 41a of the insulator-tooth-portion-side external wall portion 41T-3, in the circumferential direction of the insulator-tooth-portion-side external wall portion 41T-3, a first shape portion 41TA is formed on the side of the entry end 42A of the insulator tooth portion 42, and a second shape portion 41TB is formed on the side of the exit end 42B of the insulator tooth portion 42. For example, the first shape portion 41TA and the second shape portion 41TB are divided by a boundary representing a straight line that passes through the center of the insulator tooth portion 42 in the circumferential direction of the insulator-tooth-portion-side external wall portion 41T-3, and that runs along a radial direction of the external wall portion 41. Moreover, because of the first shape portion 41TA and the second shape portion 41TB, the insulator-tooth-portion-side external wall portion 41T-3 is asymmetrically shaped in the circumferential direction of the external wall portion 41.

As illustrated in FIG. 22, the first shape portion 41TA of the insulator-tooth-portion-side external wall portion 41T-3 has an identical shape to the insulator-tooth-portion-side external wall portion 41T according to the first embodiment, and is formed in such a way that the thickness of the insulator-tooth-portion-side external wall portion 41T-3 gradually becomes smaller as the distance from the stator 22 increases in the axial direction of the stator 22. That is, the first shape portion 41TA satisfies Equations 1 and 2 given earlier; and, at the time of winding the winding wire 46, the gap G is secured in between the leading end of the nozzle N, which passes through the middle part of the insulator tooth portion 42 in the circumferential direction of the insulator-tooth-portion-side external wall portion 41T-3, and the inner periphery 41a of the first shape portion 41TA. As a result, any contact between the nozzle N and the inner periphery 41a is avoided.

As illustrated in FIG. 23, the second shape portion 41TB of the insulator-tooth-portion-side external wall portion 41T-3 has an identical shape to the insulator-tooth-portion-side external wall portion 41T-2 according to the second embodiment, and has the step portion 41Ta that is formed on the far side from the stator 22 in the axial direction of the stator 22. That is, the second shape portion 41TB satisfies Equations 2 and 4 given earlier; and, at the time of winding the winding wire 46, the gap G is secured in between the leading end of the nozzle N, which passes through the middle part of the insulator tooth portion 42 in the circumferential direction of the insulator-tooth-portion-side external wall portion 41T-3, and the inner periphery 41a of the second shape portion 41TB. As a result, any contact between the nozzle N and the inner periphery 41a, is avoided.

At the time of winding the winging wire 46, after the nozzle N has passed through the middle part of the insulator tooth portion 42 in the circumferential direction of the external wall portion 41, the leading end of the nozzle N that circles with respect to the inner periphery 41a of the external wall portion 41, moves rotationally in a direction away from the inner periphery 41a. Hence, there is room for increasing the thickness of the external wall portion 41 at the exit end 42B of the insulator tooth portion 42. For that reason, in the insulator-tooth-portion-side external wall portion 41T-3 according to the third embodiment, the first shape portion 41TA is formed on the side of the entry end 42A of the insulator tooth portion 42, and the second shape portion 41TB is formed in which the thickness of the insulator-tooth-portion-side external wall portion 41T-3 can be increased as compared to the first shape portion 41TA. As a result, the thickness of the insulator-tooth-portion-side external wall portion 41T-3 can be increased on the side of the exit end 42B, thereby enabling suppressing a decline in the mechanical strength of the insulator-tooth-portion-side external wall portion 41T-3.

In the third embodiment too, in an identical manner to the first and second embodiments, the position for starting the winding of the winding wire 46 from the entry end 42A of the insulator tooth portion 42, is closer to the inner periphery 41a of the external wall portion 41. For that reason, regarding the wound portion 45 formed in the insulator tooth portion 42, regular winding is achieved in which the winding wire 46 is systematically wound as illustrated in FIG. 11.

Effect of Third Embodiment

In the upper insulator 24-3 according to the third embodiment, each insulator-tooth-portion-side external wall portion 41T-3 has different thicknesses on the side of the entry end 42A and on the side of the exit end 42B of the insulator tooth portion 42 in the circumferential direction. In each insulator-tooth-portion-side external wall portion 41T-3, the thickness on the side of the exit end 42B is greater than the thickness on the side of the entry end 42A. That is, as a result of forming the first shape portion 41TA and the second shape portion 41TB in the insulator-tooth-portion-side external wall portion 41T-3, the thickness on the side of the exit end 42B in the insulator-tooth-portion-side external wall portion 41T-3, can be increased as compared to the thickness on the side of the entry end 42A. Hence, as compared to the insulator-tooth-portion-side external wall portion 41T according to the first embodiment, the mechanical strength of the insulator-tooth-portion-side external wall portion 41T-3 can be further enhanced. Thus, in the third embodiment too, in an identical manner to the first embodiment, the external wall portion 41 can be prevented from falling to the inside in a radial direction thereof.

Moreover, in the third embodiment too, in an identical manner to the first and second embodiments, the winding of the winding wires 46 can be started along the inner periphery 41a of the external wall portion 41, and thus it becomes possible to achieve regular winding of the winding wires 46. That enables achieving enhancement in the quality of the wound state of the winding wires 46 in the insulator tooth portion 42, and enables achieving enhancement in the space factor of the winding wires 46 in the insulator tooth portion 42. Furthermore, because of the regular winding achieved in the wound portions 45, any contact between the nozzle N and the wound portions 45 can be avoided during the winding of the winding wires 46. Hence, it becomes possible to prevent a contact-attributed decline in the insulation properties of the winding wires 46.

Meanwhile, in the embodiments described above, although a three-phase motor is used in a rotary compressor, the usage is not limited to be in a rotary compressor. Alternatively, the three-phase motor can be used in a scroll compressor.

REFERENCE SIGNS LIST 1 compressor
3 shaft
5 compressing unit
6 three-phase motor
21 rotor
22 stator
24 upper insulator (insulator)
25 lower insulator (insulator)
41 external wall portion
41a inner periphery
41b outer periphery
41F opening-portion-side external wall portion 41T insulator-tooth-portion-side external wall portion (winding-drum-portion-side external wall portion)
41Ta step portion
41TA first shape portion
41TB second shape portion
42 (42-1 to 42-9) insulator tooth portion (winding drum portion)
43 (43-1 to 43-9) flange portion (internal wall portion)
42a peripheral surface
42A entry end (one end in circumferential direction)
42 exit end (other end in circumferential direction)
45 wound portion
46 (46-U1 to 46-U3) a plurality of U-phase winding wires
46 (46-V1 to 46-V3) a plurality of V-phase winding wires
46 (46-W1 to 46-W3) a plurality of W-phase winding wires
47 (47-1 to 47-9) opening portion
G gap
N nozzle

The invention claimed is:

1. A motor comprising:
   a rotor;
   a stator that generates a magnetic field for rotating the rotor;
   an insulator that is fixed to an end portion in axial direction of the stator, and that is cylindrical in shape; and
   a winding wire that is wound around the stator via the insulator, wherein
   the insulator includes
      an external wall portion that is cylindrical in shape,
      a plurality of winding drum portions that has one end portion thereof coupled to inner periphery of the external wall portion, and that extends in a rod-like manner from the one end portion toward radial direction of the external wall portion,
      a plurality of internal wall portions that is formed to protrude from other end portion of the plurality of winding drum portions in axial direction of the stator, and
      an opening portion formed in between each pair of the plurality of internal wall portions that are neighboring in circumferential direction,
   in the external wall portion, outer diameter sides of the plurality of winding drum portions represent winding-drum-portion-side external wall portions, and outer diameter sides of the opening portions represent opening-portion-side external wall portions, and
      the winding-drum-portion-side external wall portions have such thickness in radial direction that, in axial direction of the stator, leading end sides far from the stator are smaller than base end sides close to the stator, and thickness of base end sides of the winding-drum-portion-side external wall portions is greater than thickness of the opening-portion-side external wall portions.

2. The motor according to claim 1, wherein the thickness of the external wall portion goes on increasing from side of the opening-portion-side external wall portions toward middle part of the plurality of winding drum portions in circumferential direction of the external wall portion.

3. The motor according to claim 1, wherein, in axial direction of the stator, the external wall portion has greater height than the plurality of internal wall portions.

4. The motor according to claim 1 wherein
   the thickness of the winding-drum-portion-side external wall portions is different at one end in circumferential direction of the plurality of winding drum portions than the thickness at other end in circumferential direction, and
   the thickness at the other end in circumferential direction is greater than the thickness at the one end in circumferential direction.

5. The motor according to claim 1, wherein, the thickness of the winding-drum-portion-side external wall portions gradually becomes smaller with increase in distance from the stator in axial direction of the stator.

6. The motor according to claim 1, wherein, on inner periphery of the winding-drum-portion-side external wall portions, a step portion is formed on far side from the stator in axial direction of the stator.

7. The motor according to claim 1, wherein, on inner periphery of the winding-drum-portion-side external wall portions,
   at one end in circumferential direction of the plurality of winding drum portions, a first shape portion is formed in which the thickness of the winding-drum-portion-side external wall portions becomes gradually smaller with increase in distance from the stator in axial direction of the stator, and
   at other end in circumferential direction of the plurality of winding drum portions, a second shape portion is formed that has a step portion on far side from the stator in axial direction of the stator.

8. The motor according to claim 1, wherein, in the plurality of winding drum portions, peripheral surface, around which the winding wire is wound, has a curved surface in which thickness of the plurality of winding drum portions in axial direction of the stator goes on increasing from both ends of the plurality of winding drum portions toward middle part of the plurality of winding drum portions in circumferential direction of the external wall portion.

9. A compressor comprising:
   the motor according to claim 1; and
   a compressing unit that compresses a refrigerant when the rotor rotates a rotary shaft.

10. A motor manufacturing method for manufacturing a motor that includes
   a rotor,
   a stator that generates a magnetic field for rotating the rotor,
   an insulator that is fixed to an end portion in axial direction of the stator, and that is cylindrical in shape, and
   a winding wire that is wound around the stator via the insulator,
   the motor manufacturing method comprising:
   making use of the insulator that includes
      an external wall portion that is cylindrical in shape,
      a plurality of winding drum portions that has one end portion thereof coupled to inner periphery of the external wall portion, and that extends in a rod-like manner from the one end portion toward radial direction of the external wall portion,
      a plurality of internal wall portions that is formed to protrude from other end portion of the plurality of winding drum portions in axial direction of the stator, and
      opening portions formed in between the plurality of internal wall portions neighboring in circumferential direction,
   in the external wall portion, outer diameter sides of the plurality of winding drum portions represent winding-drum-portion-side external wall portions, and outer diameter sides of the opening portions represent opening-portion-side external wall portions, and the winding-drum-portion-side external wall portions have such thickness in radial direction that, in axial direction of the stator, leading end sides far from the stator are smaller than base end sides close to the stator, and thickness of base end sides of the winding-drum-portion-side external wall portions is greater than thickness of the opening-portion-side external wall portions; and winding that includes extending a nozzle, which supplies the winding wire, from center side in radial direction of the insulator, moving the nozzle rotationally in circumferential direction of the external wall portion and beyond the plurality of internal wall portions in axial direction of the stator, and winding the winding wire from one end in circumferential direction toward other end in circumferential direction of the plurality of winding drum portions.

11. The motor manufacturing method according to claim 10, wherein the insulator is used in which, on inner periphery of the winding-drum-portion-side external wall portions, at one end in circumferential direction, a first shape portion is formed in which the thickness of the winding-drum-portion-side external wall portions becomes gradually smaller with increase in distance from the stator in axial direction of the stator, and at other end in circumferential direction, a second shape portion is formed that has a step portion on far side from the stator in axial direction of the stator, and the motor manufacturing method comprises making leading end of the nozzle enter from the one end in circumferential direction and exit from the other end in circumferential direction.

\* \* \* \* \*